(12) United States Patent
Shekhar et al.

(10) Patent No.: US 7,689,021 B2
(45) Date of Patent: Mar. 30, 2010

(54) SEGMENTATION OF REGIONS IN MEASUREMENTS OF A BODY BASED ON A DEFORMABLE MODEL

(75) Inventors: Raj Shekhar, Elkridge, MD (US); Vladimir Zagrodsky, North Rovalton, OH (US); Vivek Walimbe, Waukesha, WI (US)

(73) Assignee: University of Maryland, Baltimore, Baltimore, MD (US)

( * ) Notice: Subject to any disclaimer, the term of this patent is extended or adjusted under 35 U.S.C. 154(b) by 883 days.

(21) Appl. No.: 11/513,082

(22) Filed: Aug. 29, 2006

(65) Prior Publication Data
US 2010/0027861 A1 Feb. 4, 2010

Related U.S. Application Data

(60) Provisional application No. 60/712,629, filed on Aug. 30, 2005.

(51) Int. Cl.
*G06K 9/00* (2006.01)
(52) U.S. Cl. .................... 382/131; 382/128; 382/173; 382/154; 600/443
(58) Field of Classification Search .............. 382/128, 382/131, 132, 173, 147, 154; 250/363.04, 250/363.02; 600/410, 443, 407, 447, 485, 600/509
See application file for complete search history.

(56) References Cited

U.S. PATENT DOCUMENTS

| | | | | |
|---|---|---|---|---|
| 6,106,466 | A * | 8/2000 | Sheehan et al. | 600/443 |
| 6,385,332 | B1 * | 5/2002 | Zahalka et al. | 382/128 |
| 2005/0238233 | A1 * | 10/2005 | Mulet Parada et al. | 382/199 |
| 2006/0171586 | A1 * | 8/2006 | Georgescu et al. | 382/173 |
| 2007/0071295 | A1 * | 3/2007 | Jackson | 382/128 |

OTHER PUBLICATIONS

Bosch, J., S. Mitchell, B. Lelieveldt, F. Nijland, O. Kamp, M. Sonka, and J. Reiber, Automatic segmentation of echocardiographic sequences by active appearance motion models, IEEE Trans. Med. Imag., Nov. 1, 2002, pp. 1374-1383, vol. 21, No. 11, Publisher: Institute of Electrical and Electronics Engineers, Inc., Published in: New York NY/US.

(Continued)

*Primary Examiner*—Vikkram Bali
*Assistant Examiner*—Ali Bayat
(74) *Attorney, Agent, or Firm*—Ditthavong Mori & Steiner, P.C.

(57) ABSTRACT

Techniques for segmenting data include receiving reference segmentation data and target data. The reference segmentation data defines a mesh indicating a boundary of a physical component in a reference body. The target data includes measured values at coordinates within a target body. Coordinates for vertices of the mesh are moved toward nearby edges in values of the target data. The adjustment also may be based on deviations from adjacent vertices or from a three dimensional generalized gradient vector field. The mesh may be initially transformed by a particular transformation that automatically maximizes a similarity measure between the target data and reference data. The reference data includes measured values within the reference body. The reference segmentation also may define a second mesh that indicates a second boundary in the reference body, and the adjustment is also based on an adjusted distance between the mesh and the second mesh.

47 Claims, 13 Drawing Sheets

OTHER PUBLICATIONS

Gerard, O., A. C. Billon, J.-M. Rouet, M. Jacob, M. Fradkin, and C. Allouch, Efficient model-based quantification of left ventricular function in 3-D echocardiography, IEEE Trans. Med. Imag., Sep. 1, 2002, pp. 1059-1068, vol. 21, No. 9, Publisher: Institute of Electrical and Electronics Engineers, Inc., Published in: New York NY/US.

Krucker, J.F., G. L. Lecarpentier, J. B. Fowlkes, and P. L. Carson, Rapid elastic image registration for 3-D ultrasoun, IEEE Trans. Med. Imag., Nov. 1, 2002, pp. 1384-1394, vol. 21, No. 11, Publisher: IEEE, Published in: New York NY/US.

Shekhar R, Zagrodsky V, Walimbe V, 3D Stress Echocardiography: Development of novel visualization, registration and segmentation algorithms, Proceedings of Computer Assisted Radiology and Surgery (CARS 2004), Jun. 1, 2004, pp. 1072-1077, Publisher: Elsevier, Published in: Amsterdam/NE.

Yezzi, A., L. Zollei, and T. Kapur, A variational framework for integrating segmentation and registration through active contours, Med. Image Anal., Jun. 1, 2003, pp. 171-185, vol. 7, No. -, Publisher: Elsevier, Published in: Amsterdam/NE.

\* cited by examiner

300
ECHOCARDIOGRAM
OF HUMAN HEART

301
SEGMENTED
ECHOCARDIOGRAM
OF HUMAN HEART

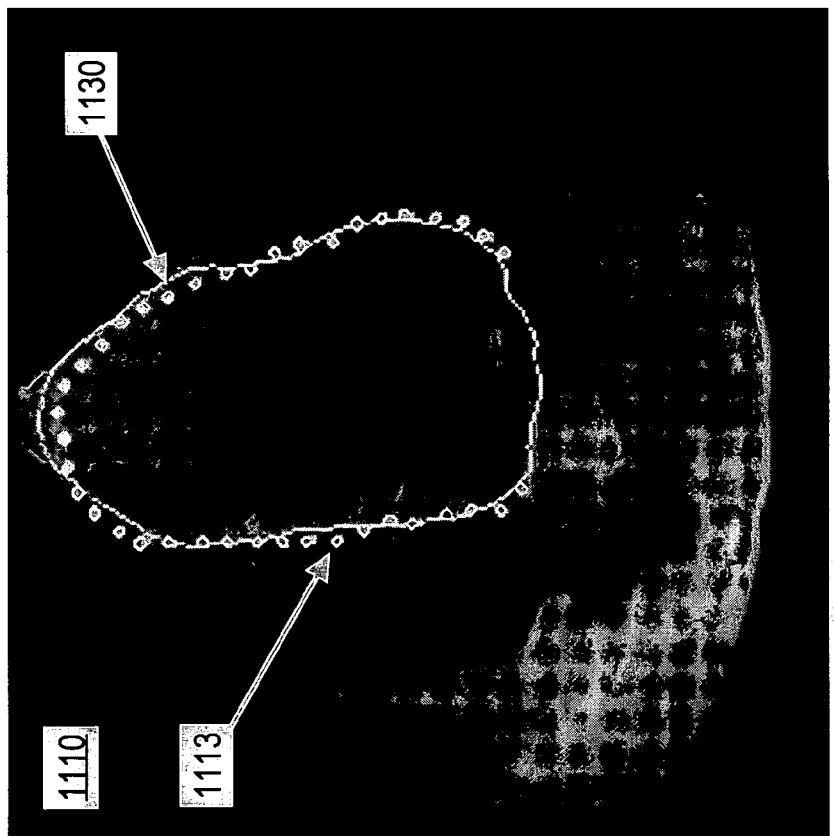
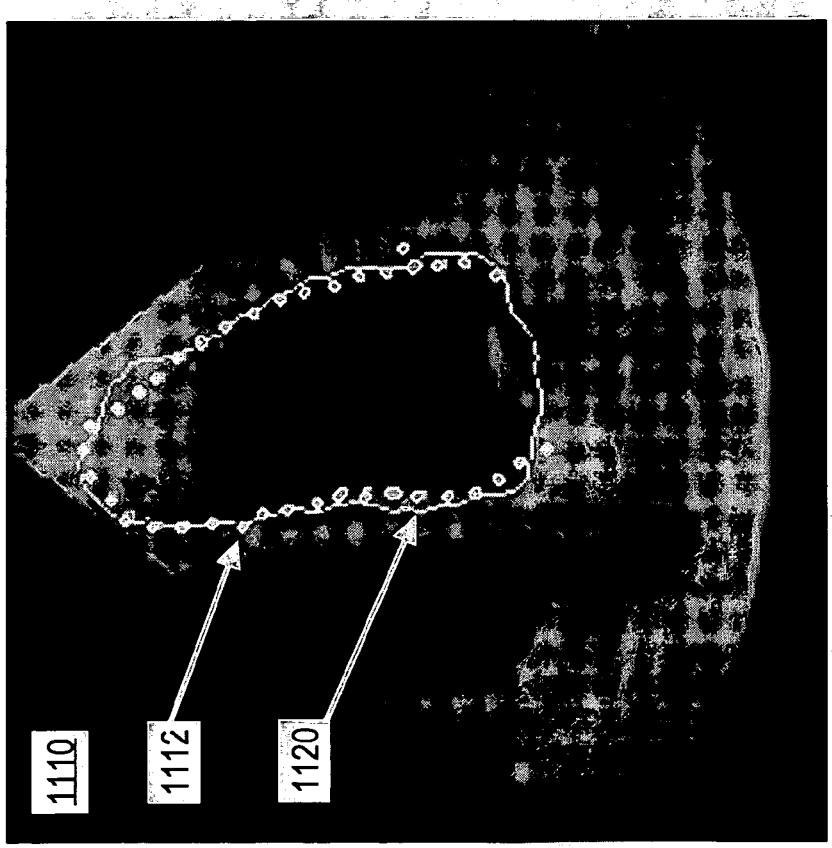

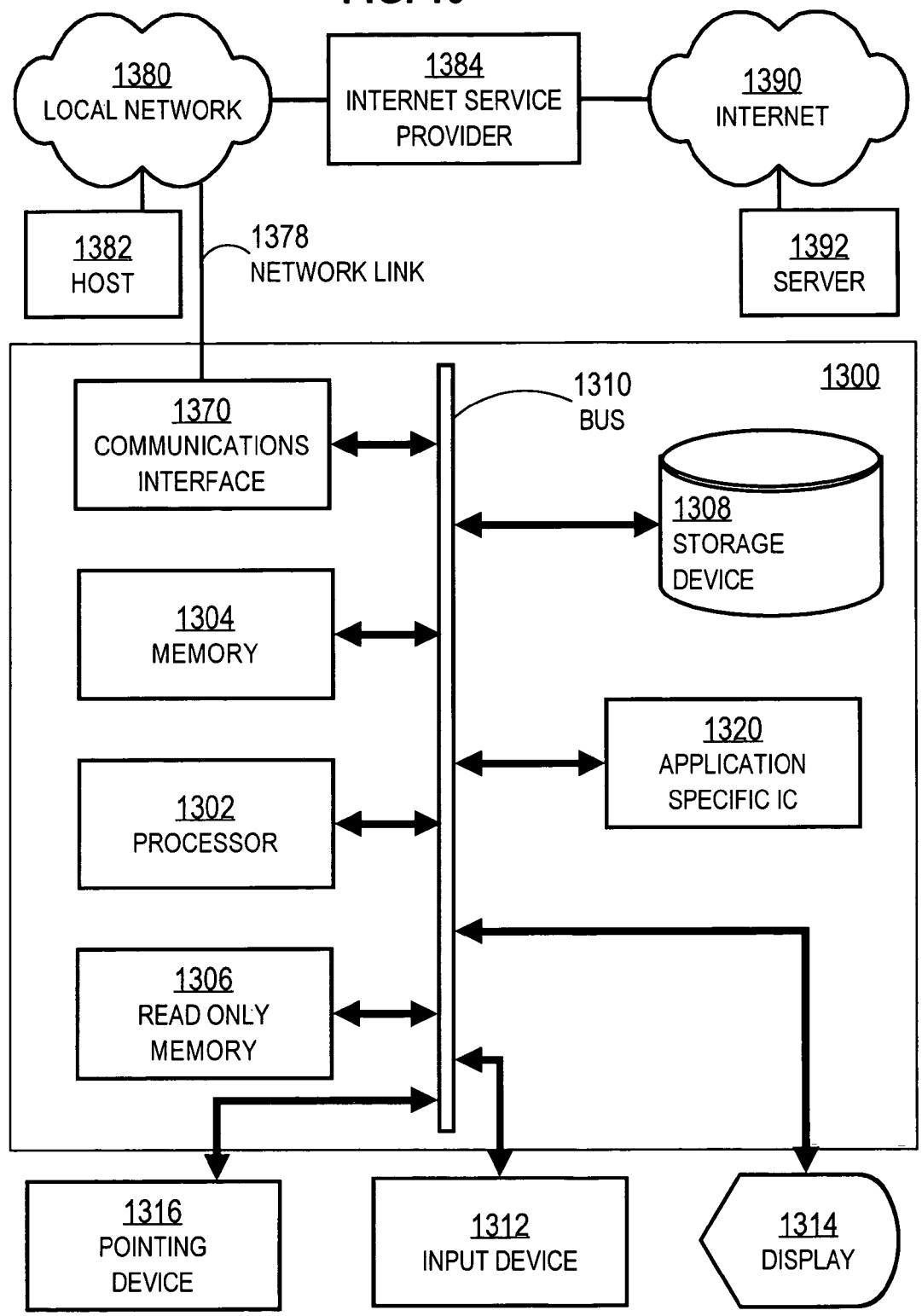

SEGMENTATION OF REGIONS IN MEASUREMENTS OF A BODY BASED ON A DEFORMABLE MODEL

CROSS-REFERENCE TO RELATED APPLICATIONS

This application claims benefit of Provisional Appln. 60/712,629, filed Aug. 30, 2005, the entire contents of which are hereby incorporated by reference as if fully set forth herein, under 35 U.S.C. §119(e).

STATEMENT OF GOVERNMENTAL INTEREST

This invention was made with Government support under Grant No. DAMD17-99-1-9034 awarded by the Department of Defense and Grant No. RG01-0071 awarded by the Whitaker Foundation. The Government has certain rights in the invention.

BACKGROUND OF THE INVENTION

1. Field of the Invention

The present invention relates to spatially segmenting measured values of a body, such as a patient, to interpret structural or functional components of the body; and, in particular to automatically segmenting three dimensional scan data such as Computer Tomography X-Ray (CT) scan data and echogram data.

2. Description of the Related Art

Different sensing systems are widely known and used for non-invasively probing the interior structure of bodies. For example, X-rays and X-ray-based computer-aided tomography (CT), nuclear magnetic resonance (NMR) and NMR-based magnetic resonance imagery (MRI), acoustic waves and acoustics-based ultrasound imagery (USI), positron emissions and positron emission tomography (PET), and optical waves have all been used to probe the human body and bodies of other animals. Some have been used to probe non-living bodies such as machinery, buildings, and geological features. Full and partial body scans can be constructed by assembling sequences of images and other output produced by these systems. Each body scan produced by a sensing system is herein called a measurement mode of the target body. In general, a measurement mode produces a two-dimensional (2D) image, a three dimensional (3D) volume based on a set of images with the third dimension being either a spatial dimension or time, or a full four dimensional (4D) volume based on three spatial dimensions and time. In the following, two dimensional as well as higher dimensional data sets are called images and two dimensional and higher dimensional portions of images are called volumes and regions.

Various sensing systems respond to different physical phenomena, and hence provide different information about structures and functions within the target body. However, many systems give relative intensities of measured values within the target body but do not automatically identify a particular intensity boundary with the edge of a particular structural component. For example, some human tissues of different organs have similar intensities and do not provide a sharp contrast edge in the measured values. In addition, the boundary between two structures may not correspond to a particular value of measured intensity. Therefore, it is common for one or more sets of measured values to be interpreted by a human expert or expert assisted automatic system in order to segment measured intensities into structurally or functionally significant regions (hereinafter called significant regions).

In general, the segmentation process to determine the significant regions in a set of measured values is tedious and time consuming with substantial input from a human expert. While suitable in many circumstances, there are deficiencies for some circumstances.

One deficiency is that such segmentation can not handle large data sets. Real-time three-dimensional (3D) echocardiography, an emerging trend in ultrasound imaging, allows fast convenient acquisition of volumetric images of the heart with temporal resolution sufficient to follow the evolution of each beat of a heart. The structure and motion of the left ventricle (LV) is of particular interest from the standpoint of diagnosing cardiovascular diseases. Real-time 3D echocardiography allows the capture of instantaneous motion of the entire LV for a complete cardiac cycle. For quantitative evaluation of the global and local function necessary for diagnosing various cardiovascular diseases, one must retrieve and track the shape of LV throughout the cardiac cycle. Manual segmentation for large data sets, such as those produced by real-time 3D echocardiography, remains excessively cumbersome, and thus unsuitable for routine clinical use. To realize the full potential offered by the spatiotemporal (3D space+ time) data sets of real-time 3D and 4D echocardiography, a robust and accurate automatic segmentation tool for tracking the dynamic shape of the wall of the LV is not just desirable, but essential. The same deficiency affects cardiac CT segmentation as well.

Another deficiency is that segmentation with manual steps can not keep pace with body operations. For example, a CT scan may be segmented to identify a tumor in the thoracic cavity; but during treatment of the tumor, the tumor moves with the breathing of the patient. The movement can be monitored with near real time CT scans or real time ultrasound scans, but the resulting measurements would not be segmented in a timely fashion using manual approaches, and the tumor may be hard to identify and treat effectively without collateral damage to healthy surrounding tissue.

Based on the foregoing, there is a clear need for techniques to perform segmentation of real time or large numbers of images that do not suffer one or more of the deficiencies of prior art approaches.

SUMMARY OF THE INVENTION

Techniques are provided for segmenting significant regions in measurements of a target body using a deformable model.

In a first set of embodiments, a method includes receiving reference data and reference segmentation data. The reference data includes values based on a first measurement mode for measuring a reference body. Each value is associated with coordinate values for spatial or temporal dimensions. The reference segmentation data includes coordinate values for spatial or temporal dimensions for each vertex. A set of vertices indicates a boundary of a physical component of the reference body in the same coordinate frame as the reference data based on the first measurement mode. Target data is also received. The target data includes values based on a second measurement mode of measuring a target body. Each target value is associated with coordinate values for spatial or temporal dimensions. A particular transformation is automatically determined to maximize a similarity measure between the reference data and the target data. The reference segmentation data is transformed using the particular transformation to produce transformed segmentation data that indicates in the target data a boundary of the physical component of the target body. At least one coordinate for at least one vertex of the transformed segmentation data is then adjusted based on gradients in values of the target data in a vicinity of the vertex.

In another set of embodiments, a method includes receiving reference segmentation data and target data. The reference segmentation data includes coordinate values for each vertex in a first set of vertices that indicates a first boundary of a myocardial wall of a body, and coordinate values for each vertex in a second set of vertices that indicates a second boundary of the myocardial wall. The target data includes values based on a measurement mode of measuring the body. Each target data value is associated with coordinate values. A coordinate for a first vertex of the first set is adjusted toward a higher gradient in values of the target data in a vicinity of the first vertex, by determining a local separation distance from the first vertex to the second boundary, and adjusting the coordinate based on the local separation distance.

In another set of embodiments, a method includes receiving reference segmentation data and target data. The reference segmentation data includes coordinate values for spatial or temporal dimensions for each vertex in a set of vertices that indicates a boundary of a physical component of a body. The target data includes values based on a measurement mode of measuring the body. Each target data value is associated with coordinate values. At least one coordinate for at least one vertex of the set of vertices is adjusted toward a higher gradient in values of the target data in a vicinity of the vertex by computing a measure of curvature at the vertex. It is determined whether the measure of curvature exceeds a threshold curvature. If so, then at least one coordinate of the vertex is changed to reduce the measure of curvature. As a result after all adjustments in an absence of a higher gradient, the plurality of vertices form a non-circular shape in at least one plane.

In another set of embodiments, a method includes receiving segmentation data and target data. The segmentation data includes coordinate values for spatial or temporal dimensions for each vertex in a set of vertices that indicates a boundary of a physical component of a body. The target data includes values based on a measurement mode of measuring the body. Each target data value is associated with coordinate values. At least one coordinate for a vertex of the set of vertices is adjusted toward a higher gradient in values of the target data in a vicinity of the vertex by deriving a vector field that points toward high gradient coordinates in the target data which represent edges in the target data. The vector fields is based on applying in three dimensions a generalized gradient vector field (GGVF) process that iteratively grows from an initial vector field based on edge detection in the target data to the vector field by filling regions of low amplitude edges with vectors that point to a region of large amplitude edges. The coordinate is adjusted based on the vector field.

In another set of embodiments, a method includes receiving segmentation data and target data and reference range data. The segmentation data includes coordinate values for spatial or temporal dimensions for each vertex in a particular set of vertices that indicates a boundary of a physical component of a body. The target data includes values based on a measurement mode of measuring the body. The reference range data indicates a distribution of distances between adjacent vertices among all pairs of adjacent vertices in a reference plurality of reference vertices that indicates a reference boundary of a physical component in a reference body. At least one coordinate for a vertex of the particular set of vertices is adjusted toward a higher gradient in values of the target data in a vicinity of the vertex. This adjustment includes determining a distance from the vertex to an adjacent vertex of the particular set of vertices. It is determined whether the distance is within a range of distances based on the reference range data. If it is determined that the distance is not within the range of distances, then an edge length adjustment is determined that is proportional to a difference between the distance and the range of distances.

In various other embodiments a computer-readable medium and an apparatus causes one or more steps of the above method to be performed.

BRIEF DESCRIPTION OF THE DRAWINGS

The present invention is illustrated by way of example, and not by way of limitation, in the figures of the accompanying drawings in which like reference numerals refer to similar elements and in which:

FIG. 11A is a diagram that illustrates a manually generated boundary for a physical component on a slice through a 3D target frame and a slice of an automatically generated 3D boundary, according to an embodiment;

FIG. 11B is a diagram that illustrates a second manually generated boundary for a physical component on the same slice through the same 3D target frame and a corresponding slice of an automatically generated 3D boundary, according to an embodiment;

FIG. 13 is a block diagram that illustrates a computer system upon which an embodiment of the invention may be implemented.

DETAILED DESCRIPTION

Figure 1:
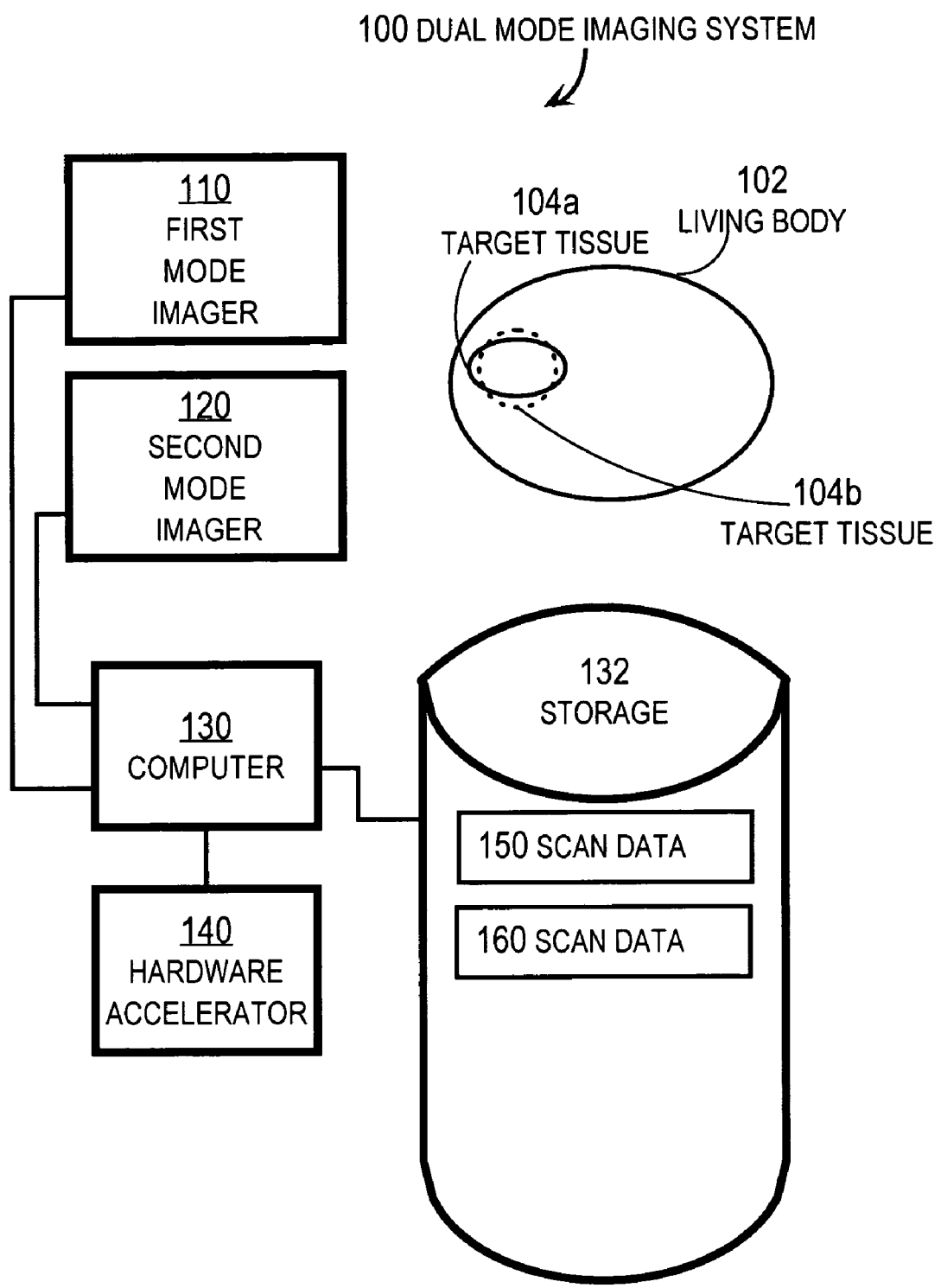
FIG. 1 is a block diagram that illustrates a dual mode imaging system, according to an embodiment.

Techniques are described for automatic segmentation of significant regions in multi-dimensional scan data. In these descriptions, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described below in the context of time varying spatially 3D echocardiograms. However, the invention is not limited to this context. In other embodiments, two or more 2D, temporally varying 2D, 4D and higher dimensional scans based on the same or different sensing systems of the same or different organs in the human body or other living and non-living bodies are segmented using these techniques, including segmenting scan data based on X-Ray images, CT scans, Positron Emission Tomography (PET) scans, Single Photon Emission Computer Tomography (SPECT) scans, and other measurement modes. In some embodiments, a previously segmented data set is registered to a different data set to compute a transformation that is applied to the original segmentation to initialize an automated deformable model. In some embodiments an improved deformable model is used without the automated registration of reference segmentation data.

Data is received and used in these embodiments. Any method may be used to receive the data, including, but not limited to predefined data stored within source code or in files stored with executable code ("default values") or in files or a database accessible to the process, human input either in response to prompts from the process or independently of prompts, or from data included in a message sent by another process, either unsolicited or in response to a request message.

As used herein, a volume element (voxel) is a value associated with multiple coordinate values corresponding to two or more spatial or temporal dimensions whether artificial or deduced from one mode of measurements. In two dimensions, a voxel is often called a pixel. In some embodiments, a voxel also has an extent in each of the two or more spatial dimensions, as well s a separation indicated by differences in their coordinates. In general, voxels of measured values have coordinate values and extents that depend on a measurement mode employed to collect the measurements. A process of relating coordinate values or extents of voxels in one data set to those of voxels in another data set is called registration. A process of relating voxels to a structure or function in a body is called segmentation.

In some embodiments, segmentation boundaries are associated with reference data that is based on simulated values rather than measured values. In general, target data is based on measured data, usually after some preprocessing to remove artifacts that are well enough understood to be removed.

As used here, a region is a portion of a simulation or measurement product, whether the product has one or more spatial dimensions with or without a temporal dimension. As used herein, elastic registration is used to refer to any non-rigid registration. Rigid registration includes translation and rotation of a whole scan; every pixel or voxel is translated and rotated from the same origin and axes by the same displacement and angular rotation. This rigid-body registration is also called global translation and rotation. Elastic registration includes linear non-rigid transformations, such as scale changes (compression and expansion, called positive and negative compression herein for convenience, along each spatial axis) and shear (linear changes in translation along each spatial axis). Elastic registration includes non-linear transformation, in which at least one of the components of translation, rotation, compression and shear change non-linearly with position in the scanned data.

1. Structural Overview

In the embodiments described herein, segmentation is propagated from one measurement mode to another. The general problem in this context is described herein with reference to FIG. 1. FIG. 1 is a block diagram that illustrates a system for obtaining and segmenting two modes of imaging a body. As used herein, target tissue is a tissue type within a living body that may change its spatial arrangement with time in a manner that is significant for directed treatment. It is not implied that the target tissue necessarily does or does not undergo any net translation.

The system 100 is for determining the spatial arrangement of soft target tissue in a living body. For purposes of illustration, a living body is depicted but is not part of the system 100. In the illustrated embodiment, a living body 102 is depicted in a first spatial arrangement at one time and includes a target tissue in a first spatial arrangement 104a at one time, such as one portion of a heart beat cycle. At a different time, in the same or different living body, the corresponding target tissue is a different spatial arrangement 104b.

System 100 includes a first mode imager 110, such as a full dose CT scanner, a PET scanner, an MRI scanner, a SPECT scanner and an ultrasound scanner. The system includes second mode imager 120, which in various embodiments is the same or a different scanner. In some embodiments the second scanner is omitted, and both measurements modes are taken by the first mode scanner operating at different times, in some embodiments with different settings or with different tracers injected into patient, or both.

In system 100, data from the imagers 110, 120 are received at a computer 130 and stored on storage device 132. Computer systems and storage devices like 130, 132, respectively, are described in more detail in a later section. Scan data 150, 160 based on data measured at imagers 110, 120, respectively, are stored on storage device 132.

System 100 includes a hardware accelerator 140 for speeding one or more processing steps performed on scan data 150, 160, as described in more detail below. For example, hardware accelerator 140 is implemented as an application specific integrated circuit (ASIC) as described in more detail in a later section, or a field-programmable gate array (FPGA). The term logic circuits is used herein to indicate any arrangement of hardware (whether mechanical, electrical, optical, quantum or other) that performs a logical function.

In various embodiments of the invention, variations in the spatial arrangements 104a, 104b of the target tissue are determined by performing manual segmentation of first mode scan data 150 and automatic adjustment of the manual segmentation based on second mode scan data 160. The first mode scan is the reference scan and second mode scan is the target scan.

Although system 100 is depicted with a particular number of imagers 110, 120, computers 130, hardware accelerators 140 and scan data 150, 160 on storage device 132 for purposes of illustration; in other embodiments more or fewer imagers 110, 120, computers 130, accelerators 140, storage devices 132 and scan data 150, 160 constitute an imaging system for automatically segmenting scan data.

Figure 2A:
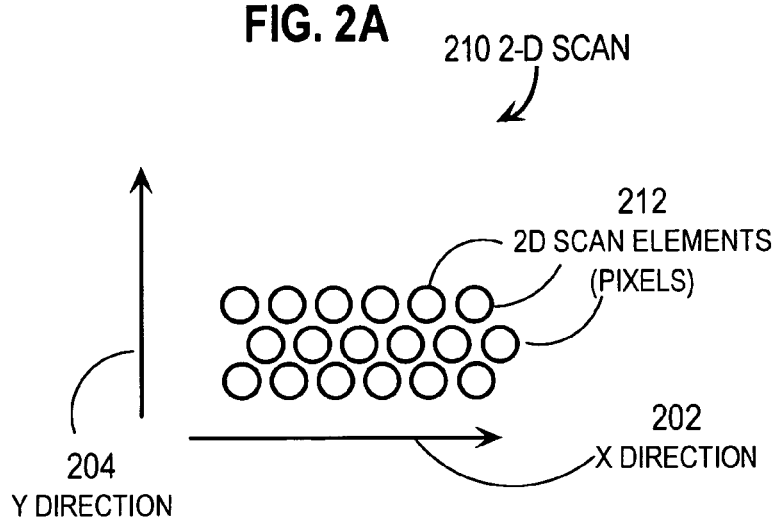
FIG. 2A is a block diagram that illustrates scan elements in a 2D scan.

FIG. 2A is a block diagram that illustrates scan elements in a 2D scan 210, such as one slice from a CT scanner or selected beams from an ultrasound scanner. The two dimensions of the scan 210 are represented by the x direction arrow 202 and the y direction arrow 204. The scan 210 consists of a two dimensional array of 2D scan elements (pixels) 212 each with an associated position. A value at each scan element position represents a measured or computed intensity that represents a physical property (e.g., X-ray absorption) at a corresponding position in at least a portion of the spatial arrangement 102 of the living body. Different intensity values at each pixel are displayed as different shades of gray between black (minimum intensity) and white (maximum intensity). Although a particular number and arrangement of equal sized circular scan elements 212 are shown for purposes of illustration, in other embodiments, more elements in the same or different arrangement with the same or different sizes and shapes are included in a 2D scan.

Figure 2B:
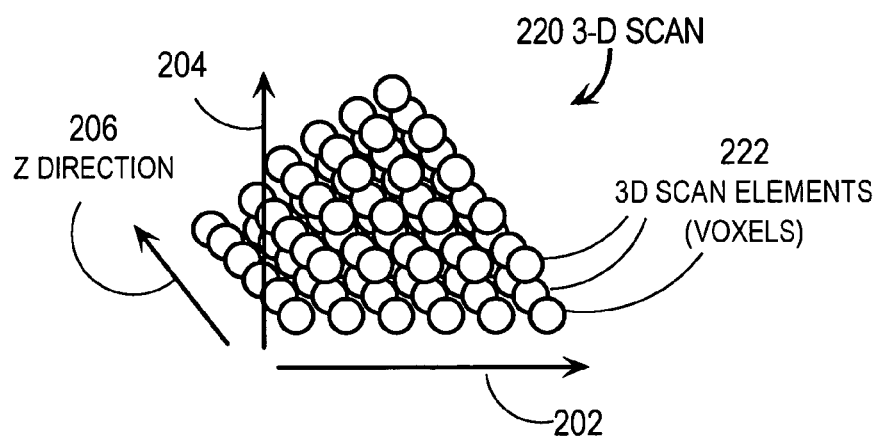
FIG. 2B is a block diagram that illustrates scan elements in a 3D scan.

FIG. 2B is a block diagram that illustrates scan elements in a 3D scan 220, such as stacked multiple slices from a CT scanner. The three dimensions of the scan are represented by the x direction arrow 202, the y direction arrow 204, and the z direction arrow 206. The scan 220 consists of a three dimensional array of 3D scan elements (voxels) 222 each with an associated position. A value at each scan element position represents a measured or computed intensity that represents a physical property (e.g., X-ray absorption or acoustic reflectivity) at a corresponding position in at least a portion of the spatial arrangement 102a, 102b of the living body. Although a particular number and arrangement of equal sized spherical scan elements 222 are shown for purposes of illustration, in other embodiments, more elements in the same or different arrangement with the same or different sizes and shapes are included in a 3D scan 220.

Figure 2C:
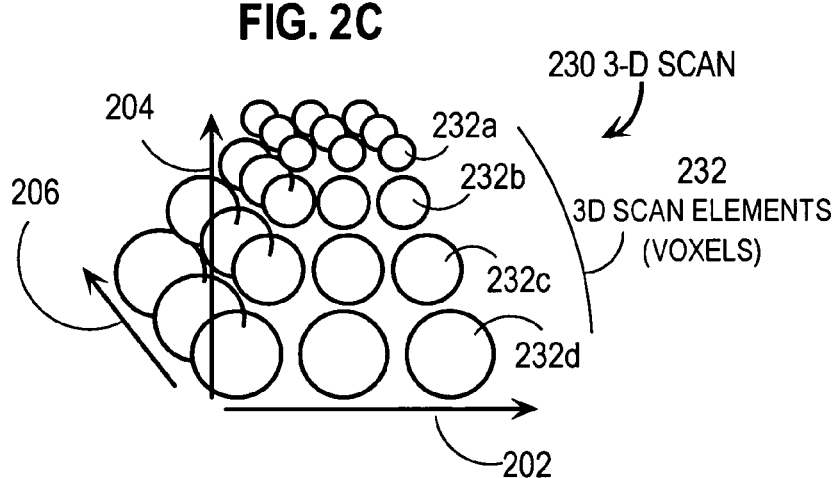
FIG. 2C is a block diagram that illustrates different scan elements in a 3D scan.

FIG. 2C is a block diagram that illustrates different scan elements in a 3D scan 230, such as from time-gated acoustic beams in a 3D acoustic scanner. The three dimensions of the scan are represented by the x direction arrow 202, the y direction arrow 204, and the z direction arrow 206. The scan 230 consists of a three dimensional array of 3D scan elements (voxels) 232 each with an associated position. In scan 230 nine beams penetrate the volume with increasing voxel size along the beam. For example, voxels 232a, 232b, 232c, 232d represent acoustic energy returned in corresponding four time windows that represent propagation of sound through corresponding distance segments in the living body. Although a particular number and arrangement of spherical scan elements 232 are shown for purposes of illustration, in other embodiments, more elements in the same or different arrangement with the same or different sizes and shapes are included in a 3D scan 230. For example, 3D acoustic voxels expand in size in the x-z plane formed by x-direction arrow 202 and z-direction arrow 206 but remain constant in size in the y-direction arrow 204, unlike the voxels depicted. Four dimensional (4D) scans are generated by a time series of 3D scans. Higher dimensional scans are possible in some applications, with the higher dimension representing variability in a different parameter, such as a scanner physical setting or an amount of tracer injected.

For example, real time ultrasound scanners produce a sequence of pyramid-shaped volumetric images, similar to that shown in FIG. 2C, at selectable frame rates. A frame is a 3D scan at one measurement time.

In the following, the term frame is used to mean scan data at one time, such as one 3D pyramid from an ultrasound scanner.

Certain voxels in the scan data are associated with the target tissue. The spatial arrangement of the target tissue is represented by the set of voxels that are associated with the target tissue, or by a boundary between such voxels and surrounding voxels. Segmentation refers to identifying the collection of scan elements that are associated with a particular physical component of the body, such as the target tissue. This identification can be done by listing the scan elements, or by defining a boundary surface between the scan elements associated with the target tissue and the volume elements not associated with the target tissue. Any digital representation of a boundary may be used. In the illustrated embodiments, the boundary is represented by a mesh of points, each point having coordinates in the space of the data set. For example in a 3D ultrasound frame each mesh point has 3 spatial coordinates.

2. Echocardiogram Segmentation Overview

Embodiments of the invention are described next in the context of echocardiograms, in which the physical property to be segmented is the myocardium of the left ventricle (LV) of the human heart. The myocardium is the wall of the heart and is defined by two boundaries, the epicardial boundary (also called the outer wall or the epicardium) and the endocardial boundary (also called the inner wall or the endocardium). The left ventricle is the major chamber of the heart that pushes blood all the way to the body's extremities.

Quantitative analysis of the LV is particularly useful from the standpoint of more accurate and objective diagnosis of various cardiovascular diseases as well as for evaluating the myocardial recovery following procedures like cardiac resynchronization therapy (CRT). Accurate true 3D segmentation of complete LV myocardium (both endocardial and epicardial boundaries) over the entire cardiac cycle is vital. Manual segmentation of the endocardial and epicardial surfaces in real-time 3D echo is very tedious due to the huge amount of image data involved (typically several hundred megabytes). Several slices need manual segmentation in each of several frames. Moreover a method based on extensive manual interaction remains subjective and susceptible to inter-observer variability. Observer exhaustion becomes a factor and leads to intra-observer variability. Thus, an accurate, robust and automatic tool for segmentation of complete LV myocardium is extremely desirable for improving clinical utility of real-time 3D echocardiograms.

Figure 3A:
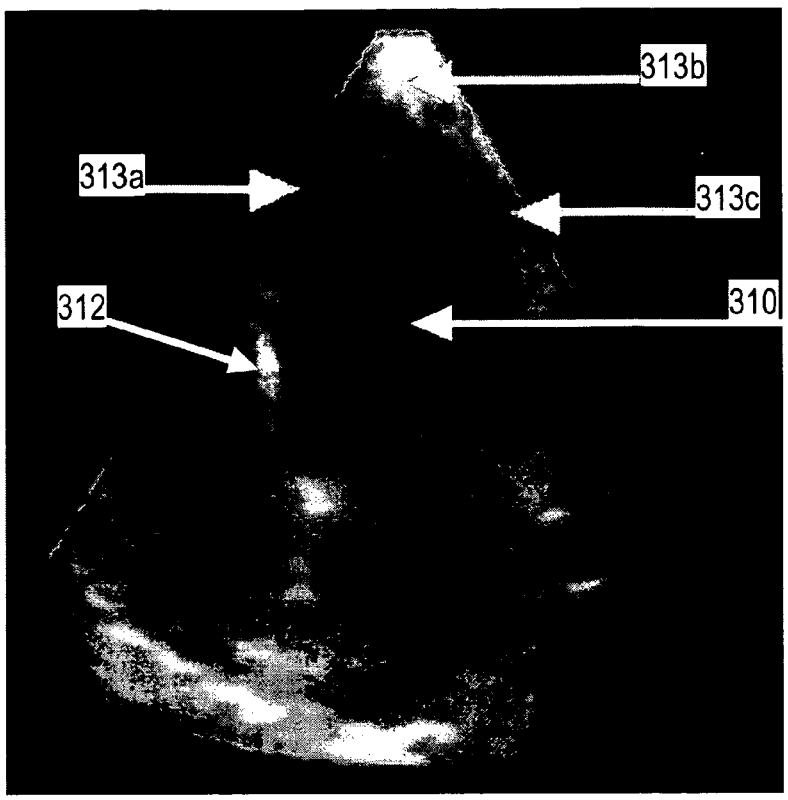
FIG. 3A is a diagram that illustrates a 2D echocardiogram image with voxel data and features of interest to be segmented, according to an embodiment.

FIG. 3A is a diagram that illustrates a 2D echocardiogram image 300 based on voxel data with features of interest to be segmented, according to an embodiment. FIG. 3A depicts a slice from 3D scan data that was acquired from the apical direction, i.e. the apex of the ultrasound pyramid is near the apex of the left ventricle. The images thus acquired include the left ventricle almost entirely and the right ventricle and left and right atria partially.

The data from a 3D frame was resampled at even spatial intervals to map to pixels for purposes of display and image processing (so called "scan converted"). Raw echogram data is very noisy, with spurious bright scan elements often called speckle unrelated to physical boundaries in the body. To remove speckle, the data was median filtered. The median filter considers each scan element in the image in turn and looks at its neighbors to decide whether or not it is representative of its surroundings. If not, the value is replaced with the median value of its neighbors. Scan converted and median filtered echogram data is called herein pre-processed echogram data.

One slice of the pre-processed echocardiogram, which depicts the left ventricle exclusive of the atria and right ventricle, is shown in FIG. 3A. The pyramidal nature of the echocardiogram data is evident. Within the pyramid where voxels are obtained, intensity variations can be seen between strong reflections (light) and weak reflections (dark). The blood within the left ventricle indicted by arrow 310 is dark. The myocardium indicated by the arrow 312 is light. Also depicted are three trouble spots indicated by arrows 313a, 313b, 313c where the entire myocardium is not evident in the slice. In spot 313a, the myocardium has fallen outside the measurement pyramid. In spot 313b, the myocardium is buried in strong reflections near the apex of the measurement pyramid. In spot 313c, the endocardium is evident but the epicardium has fallen outside the measurement pyramid.

Figure 3B:
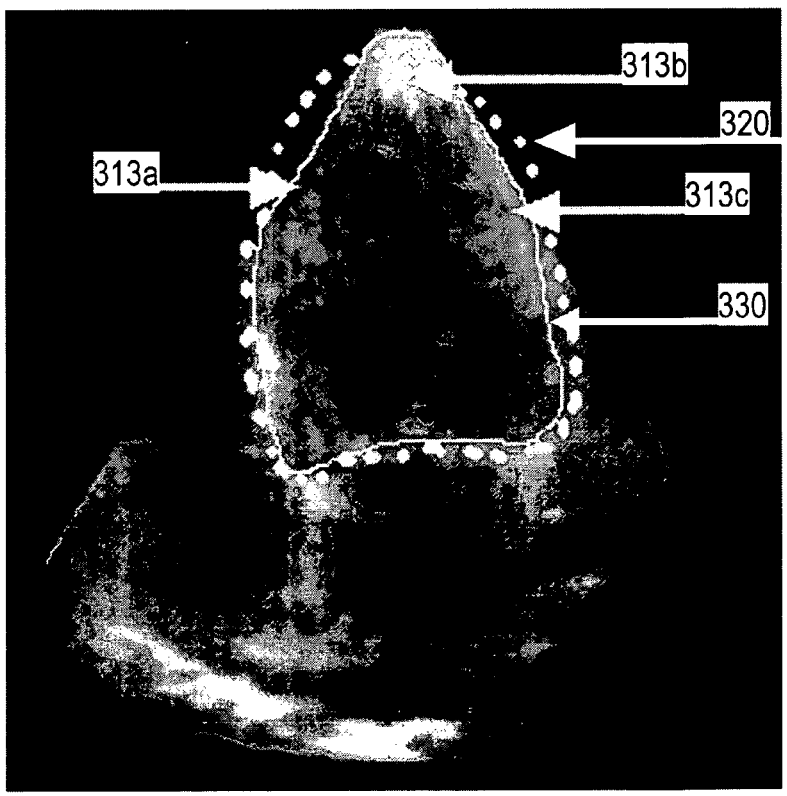
FIG. 3B is diagram that illustrates an expert segmentation boundary and an automated segmentation boundary superposed on the 2D echocardiogram of FIG. 3A, according to an embodiment.

FIG. 3B is diagram that illustrates an expert segmentation boundary 320 and an automated segmentation boundary 330 superposed on the 2D echocardiogram of FIG. 3A, according to an embodiment. Both the expert boundary 320 and the automated boundary 330 are intended to mark the epicardium. Each represents a segmentation result. Thus FIG. 3B represents a segmented echocardiogram 301. The expert segmentation boundary 320 is a manually derived 2D curve that applies only to the depicted slice of the 3D echocardiogram. The automated segmentation boundary 330 is just one 2D slice through a 3D automated segmentation boundary. Thus, the expert segmentation boundary is a 2D curve while the automated segmentation boundary is a 3D surface. The boundaries differ substantially in the three problem spots 313a, 313b, 313c, as described in more detail in a later section and repaired using certain embodiments of the invention also described in that section. FIG. 3B is presented at this juncture simply to illustrate an example objective of the segmentation process.

3. Automated Segmentation Overview

Most illustrated embodiments combine an automated registration step with a step of refining a deformable model. As used here a deformable model is a mesh (also called a wiremesh) made up of a plurality of vertices, each with two or more spatiotemporal coordinates, in which adjacent vertices define edges and adjacent edges define faces, and in which constraints are placed on vertex position changes. The constraints are called internal forces. The deformable model is refined by adjusting coordinates of its vertices so that its edges and faces align as closely as possible with high gradient regions in scan data. Thus the mesh is deformable to fit scan data. A gradient is a measure of the magnitude of a change of scan element intensity with a change in scan element position. The distance between a vertex and a nearest high gradient region, and the strength of the gradient, contribute to an external force acting on a vertex. In various embodiments, one or more meshes, constraints and vector fields described herein are used alone or in combination with each other or with automated registration to segment scan data.

Figure 4B:
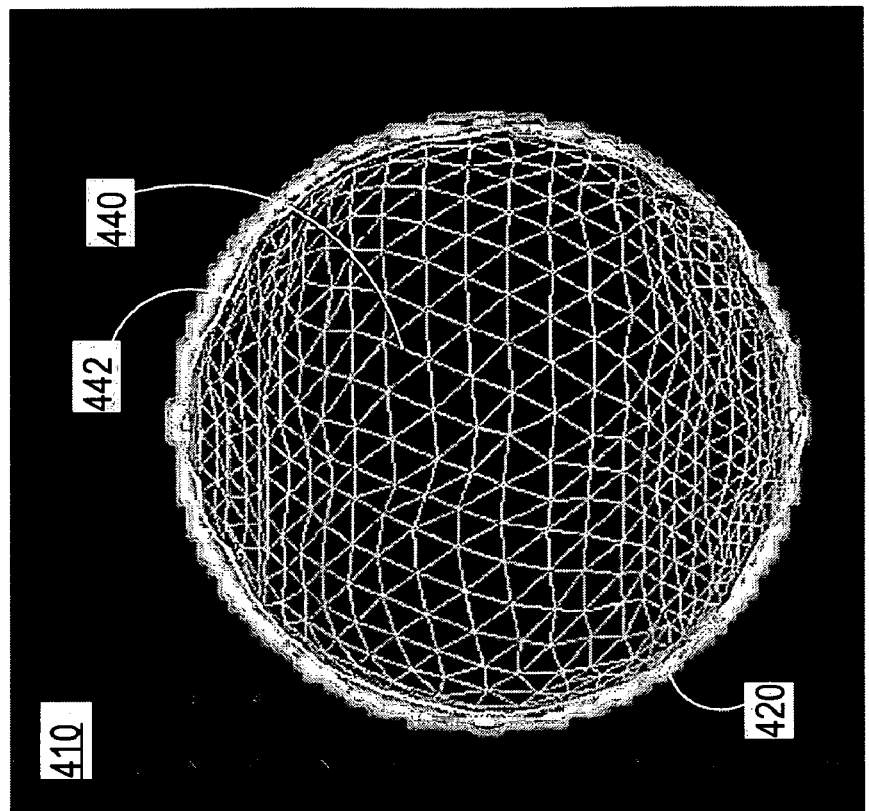
FIG. 4B is a block diagram that illustrates a slice of a deformed mesh on the slice of simulated scan data of FIG. 4A, according to an embodiment.
Figure 4A:
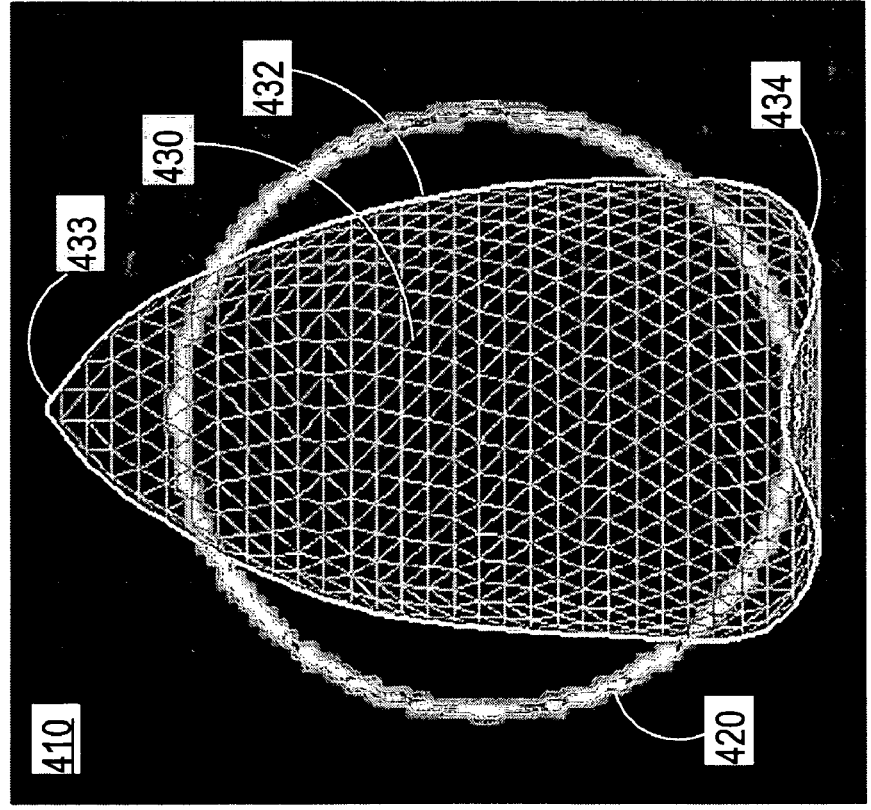
FIG. 4A is a block diagram that illustrates a slice of an initial mesh and a slice of simulated scan data with a well defined edge, according to an embodiment.

The behavior of a deformable model is illustrated in FIG. 4A and FIG. 4B. FIG. 4A is a block diagram that illustrates a slice 432 of an initial mesh 430 and a slice 410 of simulated scan data with a well defined edge, according to an embodiment. The scan data is three dimensional with a spherical shell of bright voxels causing a strong edge with neighboring black voxels. The intersection of that spherical shell with the slice 410 causes the bright circle 420 depicted in FIG. 4A. A 3D reference mesh 430 shaped as a canonical left ventricle of a human heart is centered on the center of the spherical shell. The intersection of the mesh 430 with the plane of slice 410 produces the mesh slice 432. The apex of the mesh 430 is indicated by portion 433 of the mesh slice 432. The strong gradients at the edge of bright circle 430 cause strong external forces that attract the closest vertices of mesh 430, including vertices in mesh slice 432. At each iteration of refinement (also called deformation or adjustment), the vertices move incrementally toward the edge, constrained by the internal forces. The process is repeated until an end condition is achieved. In various embodiments, the end condition is satisfied when none of the vertices move by more than a user-defined threshold distance or when a predefined maximum number of iterations is reached.

FIG. 4B is a block diagram that illustrates a slice 442 of a deformed mesh 440 on the slice 410 of simulated scan data of FIG. 4A, according to an embodiment. The scan data 410 and circle 420 are as described in FIG. 4A. Upon the end conditions, the original mesh has changed to the deformed mesh 440 that intersects the slice 410 of the scan data on curve 442. The mesh slice 442 approximates the position of the inside edge of the circle 420 within a distance on the order of one voxel separation distance.

Proper initiation is critical for good performance from deformable models applied in scan data that has many edges representing features other than the feature to be segmented. Articles describing these embodiments have recently been published by V. Zagrodsky, V. Walimbe, C. R. Casto-Pareja, J. X. Qin, J-M. Song and R. Shekhar, "Registration—Assisted Segmentation of Real-Time 3-D Echocardiographic Data Using Deformable Models," Institute of Electrical and Electronics Engineers (*IEEE*) *Transactions in Medical Imaging*, vol. 24, pp 1089-1099, September 2005 (hereinafter Zagrodsky); and by V. Walimbe, V. Zagrodsky and R. Shekhar, "Fully Automatic Segmentation of Left Ventricular Myocardium in Real-time Three-dimensional Echocardiography," *Proceedings of SPIE* (*Medical Imaging* 2006, San Diego, Calif., USA), 6144:61444 H-1, March, 2006 (hereinafter Walimbe), the entire contents of each of which are hereby incorporated by reference as if fully set forth herein. These articles also describe the relative advantages of registration and deformable model refinement, and the reasoning leading to the particular choices made for the illustrated embodiment, described herein.

Image registration is the process of aligning two or more images that represent the same object, where the images may be taken from different viewpoints or with different sensors or at different times or some combination. A transformation that aligns two images can be classified as rigid, linear elastic (affine), or non-linear elastic. Rigid transformations include translation or rotation or both; the others are non-rigid. Affine transformations are linear elastic transformations that add shear or compression changes or both. A non-linear elastic transformation is a special case of a non-rigid transformation that allows for local adaptivity (e.g., uses a transform that varies with position within the scan) and is typically constrained to be continuous and smooth. Sub-volume division registration described by Vivek Walimbe, Vladimir Zagrodsky, Shanker Raja, Bohdan Bybel, Mangesh Kanvinde and Raj Shekhar, "Elastic registration of three-dimensional whole body CT and PET images by quarternion-based interpolation of multiple piecewise linear rigid-body registrations," *Medical Imaging* 2004: *Image Processing*, edited by J. Michael Fitzpatrick, Milan Sonka, Proceedings of SPIE Vol 5370, pp. 119-128, SPIE, Bellingham, Wash., February 2004, is a collection of piecewise rigid-body transformations stitched together to form globally a non-linear elastic transformation.

Automatic registration is performed by defining a measure of similarity between two scans and selecting a transform that maximizes the measure of similarity. Any known measure of similarity may be used. In several illustrated embodiments, the measure of similarity is called mutual information (MI), well known in the art, and described in R. Shekhar and V. Zagrodsky, "Mutual Information-based rigid and nonrigid registration of ultrasound volumes," IEEE Transactions in Medical Imaging, vol. 21, pp. 9-22, 2002, (hereinafter, Shekhar), the entire contents of which are hereby incorporated by reference as if fully set forth herein.

Figure 5A:
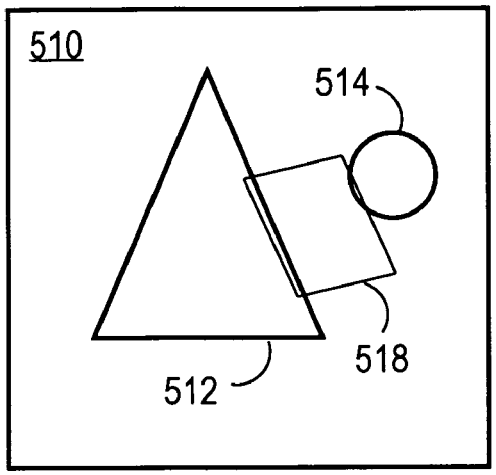
FIG. 5A, FIG. 5B, FIG. 5C and FIG. 5D are block diagrams that illustrate the use of a reference image and a target image to automatically derive a registration transformation field, according to an embodiment.

The concept of registration for mesh initialization during segmentation is demonstrated here. FIG. 5A, FIG. 5B, FIG. 5C and FIG. 5D are block diagrams that illustrate the use of a reference image and a target image to automatically derive a registration transformation field, according to an embodiment. FIG. 5A depicts scan data 510 and reference segmentation boundary 518. Shapes 512 and 514 represent regions of exceptionally dark and exceptionally light voxels, respectively, in scan data 510. It is assumed, for purpose of illustration, that an expert has examined the scan data 510 and manually produced segmentation boundary 518 to indicate the edge of an organ indicted by more subtle changes in voxel intensity than indicated by shapes 512 and 514.

Figure 5B:
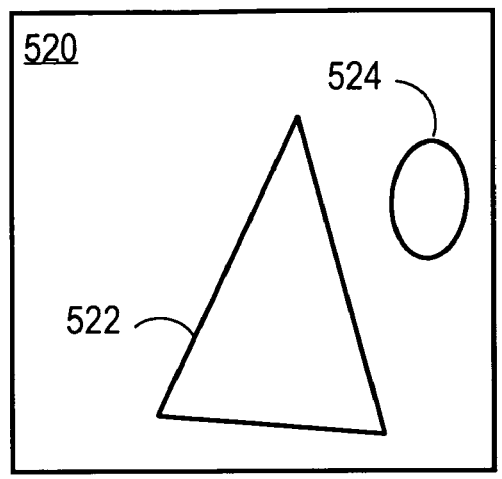

FIG. 5B depicts second scan data 520. Shapes 522 and 524 represent regions of exceptionally dark and exceptionally light voxels, respectively, in scan data 520. No expert examines the scan data 520. Automatic registration is performed to determine the transforms that approximately related features in scan 510 to features in scan 520, limited by the complexity and number of coefficients used to model the transformation. It is assumed for purpose of illustration that a simplified global affine transformation is applied with three translation degrees of freedom, three rotation degrees of freedom, and three compression degrees of freedom, requiring the optimization of nine parameters (the values of which are called coefficients, herein).

Figure 5C:
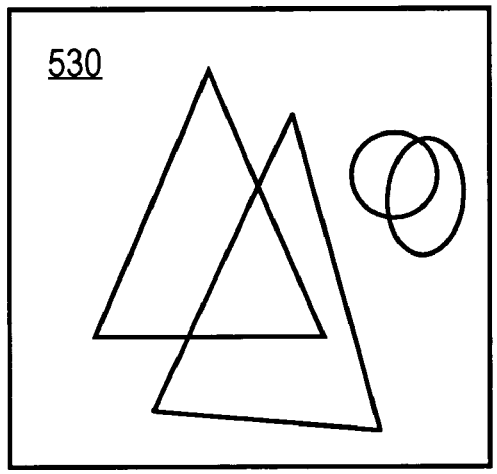

FIG. 5C depicts the superposition 530 of the two scans. A measure of similarity is made for this overlap, and then the coefficients of the transformation are varied until the measure of similarity reaches a maximum. Any similarity measure appropriate for automatic registration of the available scan data may be used. In the illustrated embodiment, described below, the measure of similarity is mutual information (MI) and the maximization process is as described in Shekhar, cited above. The transformation that provides the maximum measure of similarity is the selected transformation.

Figure 5D:
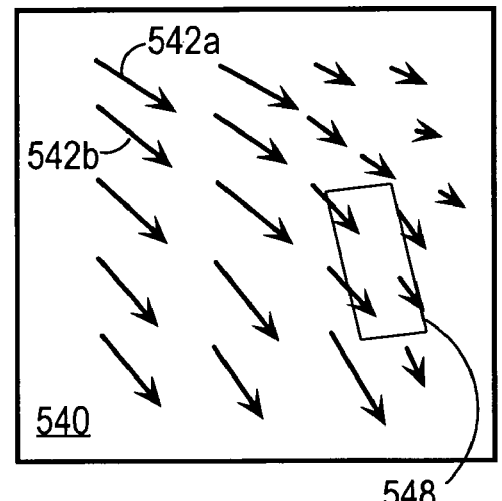

FIG. 5D depicts an array 540 of transformation vectors. It is assumed for purposes of illustration that these transformation vectors move selected voxels of the scan 510 to corresponding voxels in scan 520 based on the selected transformation. The transformation vectors include transformation vector 542a and transformation vector 452b and others, collectively referenced herein as transformation vectors 542. Each transformation vector 542 has a tail at a position of a voxel in the original scan 510 and an arrowhead pointing to the corresponding voxel in the scan 520. The transformation provides vectors for all voxels but only a few are shown to avoid obscuring the figure.

According to some embodiments of the invention, the selected transformation is used to transform expert segmentation boundary 518 for the reference scan data 510 to produce a transformed segmentation boundary for scan 520. It is assumed for purposes of illustration that boundary 548 in FIG. 5D is the result of transforming the boundary 518 by the selected transform vector array 540. Boundary 548 is then used to form an initial mesh for the deformable model. According to these embodiments, the deformable model is refined based on (subtle) edges detected in scan data 520 in the vicinity of boundary 548.

In some embodiments, elastic transformations are implemented in whole or in part in hardware to speed the computation of the spatially dependent transforms. For example, as described in U.S. patent application Ser. No. 10/443,249 and in C. R. Castro-Pareja, J. M. Jagadeesh, R. Shekhar, IEEE Transactions on Information Technology in Biomedicine, vol. 7, no. 4, pp. 426-434, 2003, the entire contents of each of which are hereby incorporated by reference as if fully set forth herein, fast memory and cubic addressing are used to store and access the two scans and determine and store a joint mutual histogram (MH) used in the computation of MI as a similarity measure for image registration.

4. Method for Automated Segmentation

Figure 6:
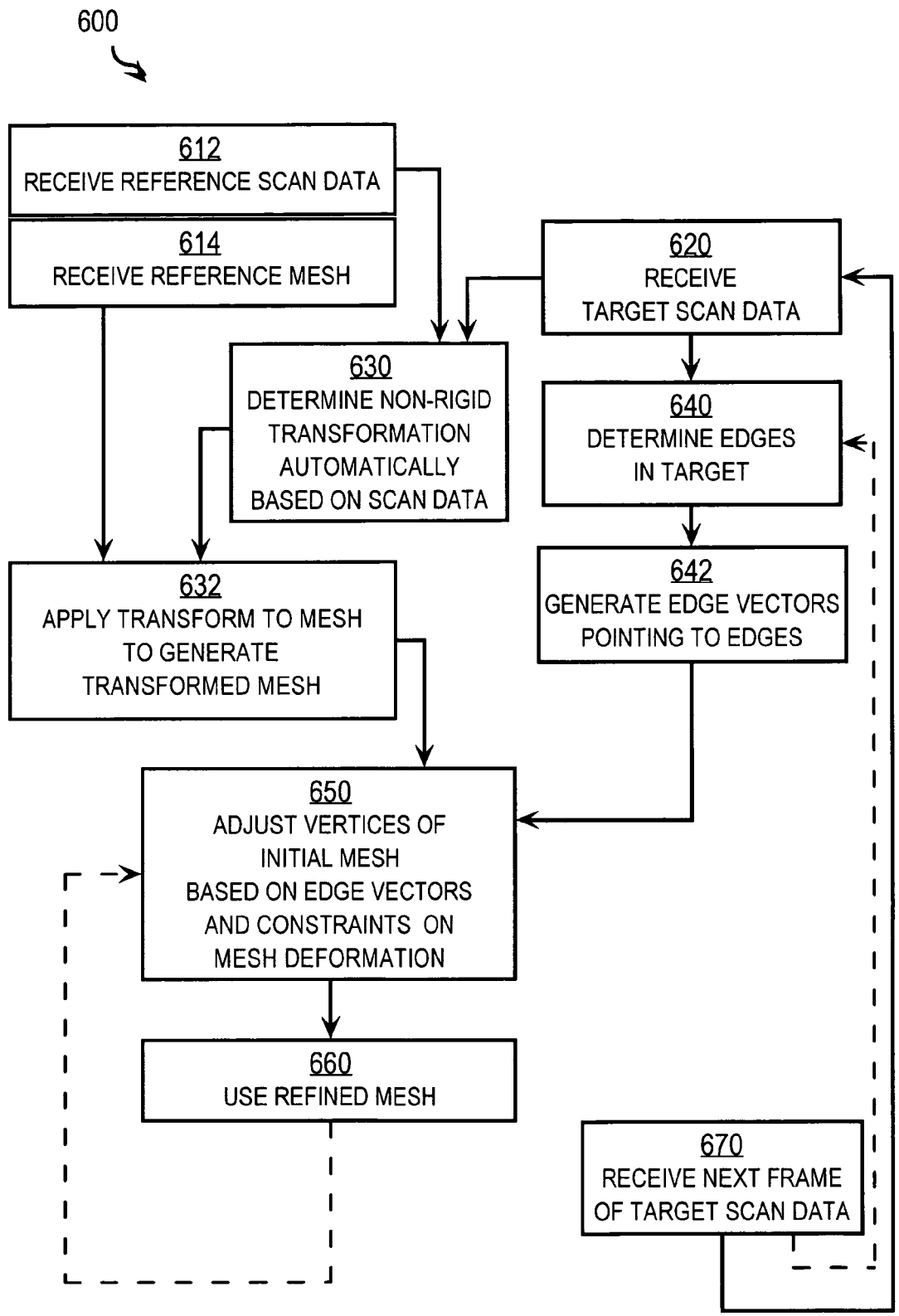
FIG. 6 is a flow diagram that illustrates at a high level a method to automatically segment scan data, according to an embodiment.

FIG. 6 is a flow diagram that illustrates at a high level a method to automatically segment scan data, according to an embodiment. Although steps are shown in FIG. 6 and subsequent flow diagrams (e.g., FIG. 8) in a particular order with some overlapping in time for purposes of illustration, in other embodiments, one or more steps are performed in a different order or overlap in time in different ways, or are performed sequentially by one or more processors acting in series or in parallel, or one or more steps are omitted, or additional steps are added, or the method is changed in some combination of ways.

In step 612, reference scan data is received. For example, scan data 510 in FIG. 5A is received. It is anticipated that, in some embodiments, reference scan is a first scan of a series of scans (frames) taken in sequence. For example, in some embodiments scan data such as echocardiogram data 300 depicted in FIG. 3A is the reference data. It is also anticipated that in some embodiments, the reference data is data for a canonical healthy person available in a library and used as a reference for many patients. It is also anticipated that the reference data represents a weighted or unweighted average of many person used to define a canonical form of scan data. It is also anticipated that reference scan data is data from a diseased patient, or an average of several diseased patients, in order to facilitate diagnosis of disease symptom, such as a tumor. Step 612 includes performing any pre-processing on the scan data. In the illustrated embodiment, step 612 includes the pre-processing steps of scan conversion and median filtering. In the illustrated embodiment, the reference scan data was manually cropped to remove strong density artifacts away from the LV.

In step 614, a reference mesh is received. For example, a 3D mesh defining boundary data 518 in FIG. 5A is received. As another example, the expert boundary 320 in FIG. 3B together with expert boundaries on other slices through the same 3D scan data are used to construct a reference mesh. In practice, the particular echocardiogram 300 is not a suitable reference scan for a reference mesh based on expert boundary 320, because of the multiplicity of problem areas 313a, 313b, 313c. While brightness at measurement apex 313b can not be entirely avoided, other scans have fewer problems with one or both walls of the myocardium out of scanner view.

The combination of the reference scan data received in step 612 and the reference mesh received in step 614 is called the "dual voxel+wiremesh template" in Zagrodsky and Walimbe, cited above.

A mesh includes a set of vertices that span the boundary, spaced close enough that straight line segments connecting adjacent vertices approximates any curvature in the surface of the region to be bounded closely enough for an application of interest. Adjacent vertices are determined by a triangulation process that associates each vertex with several adjacent vertices to form edges of the mesh. A planar facet enclosed by three edges is a triangular face of the mesh by which it gets its name. Any mesh process known in the art may be used. In the illustrated embodiment, the reference mesh (also called the wiremesh template) was created by triangulating smoothed, manually traced 2D contours of the endocardium or epicardium in a set of 30 parallel short-axis image slices spanning the LV from its base to the apex. The triangles were selected to be of approximately equal size, but the edge lengths varied somewhat between a minimum distance, dmin, and a maximum distance, dmax.

In some embodiments, during step 614, two correlated reference meshes are received. This is done to allow better segmentation of the entire myocardium, as described in Walimbe, cited above.

As noted in Walimbe, epicardium segmentation is more challenging than that for the endocardium. Often the epicardial features are represented by lower intensity differences compared to the endocardial features due to the lower acoustic density differences at the tissue-tissue interfaces at the epicardial surface compared to the blood-tissue interface at the endocardial surface. As a result, a reference mesh for epicardium has a tendency to attach itself to the endocardial surface when refined independently of the endocardial mesh, as shown by the automatic boundary 330 in FIG. 3B. Also, when the acquisition is from the apical view, the apical cap of the myocardium is often hidden in the high intensity artifact at the point of incidence of ultrasound pulses. This artifact predominantly affects the epicardial surface at the apex. As seen in FIG. 3B, there is a disagreement between an expert's estimation of epicardial boundary and the automatic boundary, especially in the apical region of the LV, if the epicardium segmentation is attempted separately from the endocardium. In addition, it is difficult to correctly identify the epicardial boundary near the opening of the aorta. Examples of such problems areas are illustrated in FIG. 3A. Due to these types of artifacts, the independent detection of epicardium is challenging. As expected, this disagreement is more significant in problem areas as shown in FIG. 3B Walimbe shows how to overcome the challenges in epicardium segmentation using a priori information about the relative orientation (position and spacing) of the endocardial and epicardial surfaces to 'guide' the mesh refinement algorithm towards the final solution. In various embodiments, the joint relationship is utilized to define additional forces to act on endocardium or epicardium, or both, when performing mesh refinement. In the illustrated embodiment, constraints on the adjustment of the endocardial and epicardial mesh vertices are defined during mesh refinement.

Figure 7B:
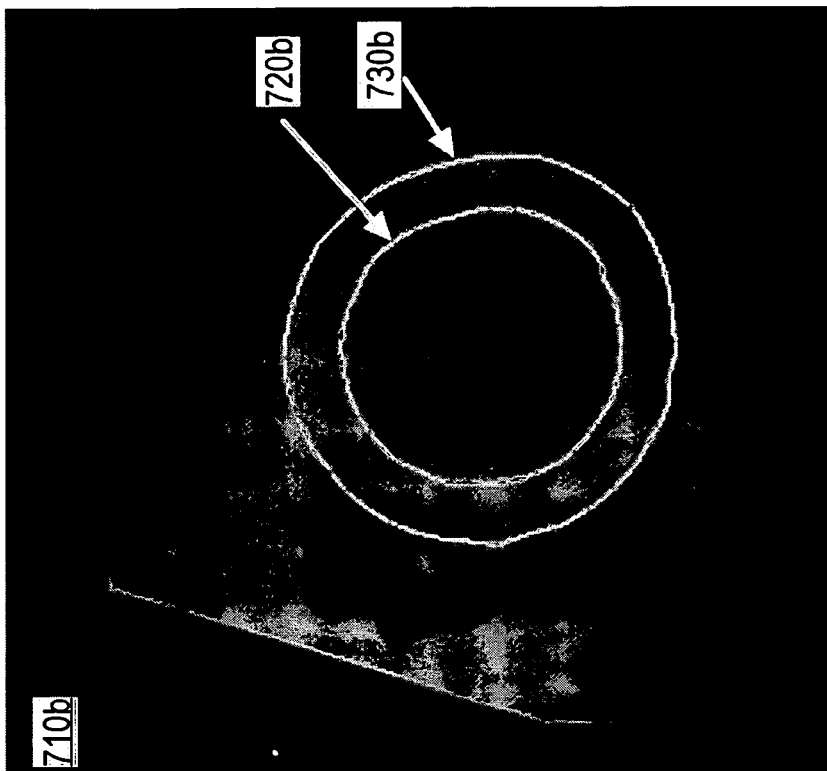
FIG. 7A and FIG. 7B are diagrams that illustrate two reference boundaries in each of two images that represent slices through 3D reference scan data, according to an embodiment.
Figure 7A:
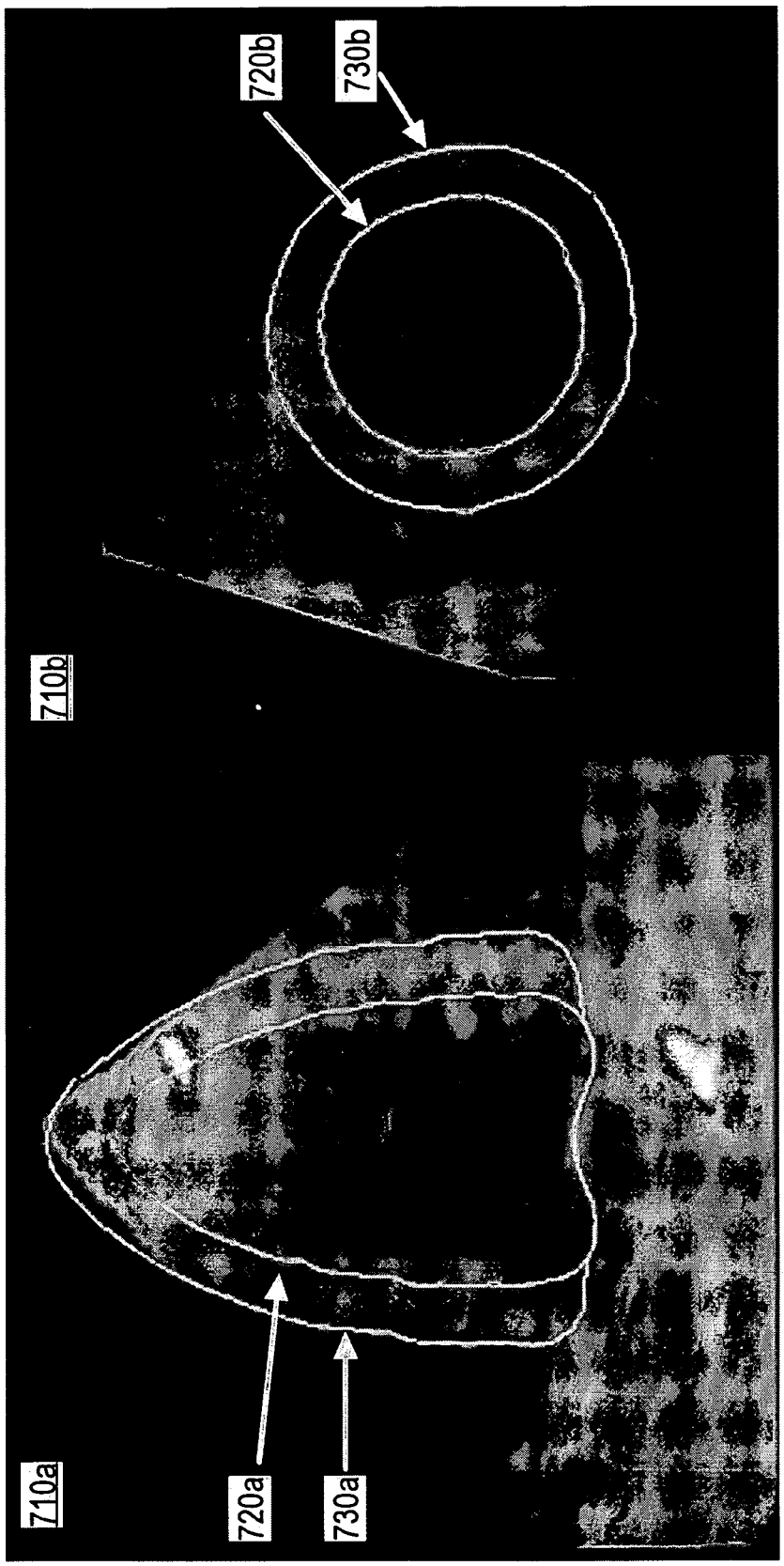

FIG. 7A and FIG. 7B are diagrams that illustrate two reference boundaries in each of two images that represent slices through 3D reference scan data, and a 3D reference mesh, according to an embodiment. FIG. 7A shows image 710a of voxel intensities in a vertical slice through the 3D reference scan data. Shown in the same plane is an endocardial reference boundary 720a and a epicardial reference boundary 730a, both based on manual expert analysis. FIG. 7B shows image 710b of voxel intensities in a horizontal slice through the same 3D reference scan data. Shown in the same plane is an endocardial reference boundary 720b and a epicardial reference boundary 730b, both based on manual expert analysis. An endocardial reference mesh is generated based on endocardial boundary 720a, 720b and others manually input in other planes. Similarly, an epicardial reference mesh is generated based on epicardial boundary 730a, 730b and others manually input in other planes.

In some embodiments reference meshes are generated from a canonical mesh model (e.g., mesh 430 in FIG. 4A) and simulated echocardiogram data generated for tissues distributed according to the canonical model are used as the reference scan data.

In step 620, target scan data is received. Step 620 includes performing any pre-processing on the scan data. In the illustrated embodiment, step 620 includes the pre-processing steps of scan conversion and median filtering.

In step 630, a registration transformation is determined automatically based on the reference scan data received in step 612 and the target scan data received in step 620. For example the transformation represented by transformation vectors 542 in FIG. 5D is determined automatically.

In an illustrated embodiment, during step 630, a non-rigid automatic registration based on maximization of mutual information is performed with eight global parameters representing three degrees of freedom in translation and rotation, and two degrees of freedom in compression (also called scale)—the so called "eight-parameter mode."

In practice, and thus in other embodiments, the transformation mode used is a compromise between two extremes. At one extreme, step 630 is omitted altogether and deformation refinement is attempted with the untransformed reference mesh. This approach is not expected to be successful with echocardiogram data because the abundant artifacts and speckles in an ultrasound image would not permit convergence of the deformable model on the desired surface. The approach is also not expected to be successful if the deformable model is initialized too far from the edges in an image. The other extreme is a fully elastic registration of the voxel template with the image to be segmented such that the transformed wiremesh template would not require any additional refinement. The latter approach might succeed only in those rare situations involving high-resolution artifact-free images that show a clear relationship of voxel intensities with tissue types, which is not the case with echocardiography. In the illustrated embodiment, a simpler registration mode suffices since the registration only serves as a means for initial placement of the deformable mode mesh.

The simpler the transformation mode (i.e., fewer degrees of freedom), the more robust is the MI-based registration of ultrasound images, and hence the more robust is the overall segmentation. Based on this consideration, the illustrated embodiment employs the simplest transformation mode adequate for initial placement of the wiremesh template within a range in which the second mesh refinement converges on a solution. This can be determined by experimentation for a particular embodiment. A series of linear transformation modes with increasing complexity have been tested. Six-parameter rigid-body mode and seven-parameter global scaling mode (rigid-body with a global scale factor) have proved to be insufficient for the task because of inter-patient left ventricular size variations. However, an eight-parameter mode (rigid-body with two scaling factors) provided satisfactory initialization. Performance was not noticeably improved with the use of nine to twelve parameters.

The eight-parameter mode included two scaling factors: longitudinal scale applied along the long axis of the LV, and transverse (radial) scale applied uniformly to the two geometrical axes perpendicular to the long axis. For convenience, the reference mesh in step 612, above, is created with respect to the long axis of the LV. Since this axis did not in general coincide with the central axis of the pyramid-shaped 3D ultrasound image, the original image was appropriately tilted and resampled in the pre-processing step of scan conversion, during step 612, to create the reference scan data (also called the "voxel template").

MI-based registration is fulfilled by maximization of the MI similarity measure MI(A, TB) between a stationary scan data A and a floating scan data B in the domain of applicable transformations T. Mutual information between scan data A and B'=TB is determined as a function of their respective individual probability density functions p(a) and p(b') and the joint probability density function p(a,b') of voxel intensities in a region of their overlap, where a is a voxel intensity observed in scan data A and b' is a voxel intensity observed in scan data B'.

$$MI(A, TB) = \Sigma_a \Sigma_{b'} p(a,b') \log [p(a,b')/\{p(a)*p(b')\}] \quad (1)$$

which physically conveys the amount of information that A contains about B', or vice versa.

The target scan data was treated as stationary (A) and the reference scan data as floating (TB). Registration used MI as the voxel similarity measure. The ultrasound intensities in both target and reference were quantized and partial-volume interpolated to form the joint histogram and subsequently achieve a smooth MI function. A downhill simplex algorithm during optimization to find the values of the eight parameters (i.e., coefficients) that maximized MI. Interpolation and optimization are exactly as described previously by Shekhar.

In step 632, the transform determined automatically in step 630 is applied to ten reference mesh to generate a transformed mesh. For example the transformation that produced transformation vectors 542 is applied to reference boundary 518 to generate e a transformed boundary 548, as depicted in FIG. 5A and FIG. 5D, respectively.

Before, during or after steps 630 and step 632 are performed, the same or a different processor performs steps 640 and 642 to produce a vector field based on the edges in the target scan data.

In step 640 edges are detected in the target scan data. Any method may be used to detect voxels that belong to an edge. In an illustrated embodiment, a Sobel edge detector is used as extended for three dimensional data and described in S. P. Liou and R. Jain, "An approach to three-dimensional image segmentation," CVGIP: Image Understanding, vol. 53, pp. 237-252, 1991, the entire contents of which are hereby incorporated by reference as if fully set forth herein. The resulting edge intensities at voxels were clamped to lessen the amplitude of very strong edges and to remove very weak edges caused by noise. During clamping, edge values greater than a maximum allowed value are set to the maximum allowed value and edge values less than a minimum were set to the minimum.

In step 642, vectors pointing to the nearest strongest edge are derived from the clamped 3D edge voxels. In some embodiments, a gradient operator is applied, to produce vectors that indicate the direction of strongest change in the edge values. A problem with such a vector field is that the edges have a narrow region of influence and such a vector field is very sparse, with many voxels not having a vector at all. The region of influence is typically on the order of the size of sliding window (kernal) used to compute the edge values—a few voxels across. Thus the nearest edge may not be felt by a mesh vertex and the vertex would not move in the desired direction.

To extend the region in which an edge affects a vertex, a 2D generalized gradient vector field (GGVF) algorithm developed by C. Xu and J. L. Prince, "Snakes, shapes, and gradient vector flow," IEEE Transactions in Image Processing, vol. 7, pp. 359-369, 1998, and C. Xu and J. L. Prince, "Generalized gradient vector flow external forces for active contours," Signal Processing, vol. 71, pp 131-139, 1998, the entire contents of each of which are hereby incorporated by reference as if fully set forth herein, was extended to 3D. This 3D extension of GGVF iteratively grows the vector field F in three dimensions based on the result of the edge detection, E.

According to the 3D extension of GGVF, the eEdge strength E is a function of 3 dimensional voxel coordinates x, y and z and the iteration begins with the following definitions for the gradient vector F, and the magnitude G of the initial gradient vector $F^0_{x,y,z}$:

$$G = (\partial E/\partial x)^2 + (\partial E/\partial y)^2 + (\partial E/\partial z)^2 \quad (2a)$$

$$F^0_{x,y,z} = (\nabla E)_{x,y,z}$$

$$(\text{i.e., } F^0_x = \partial E/\partial x; F^0_y = \partial E/\partial y; F^0_z = \partial E/\partial z) \quad (2b)$$

$$\beta = 1 - \exp(-\mu G) \quad (2c)$$

$$\gamma_{x,y,z} = \beta (\nabla E)_{x,y,z} \quad (2d)$$

in which the superscript for F indicates the iteration number and the subscript indicates the direction, μ is a generalization factor. The vector field F is then iteratively spread to neighboring locations according to Equation 3.

$$F^i_{x,y,z} = (1-\tau\beta)F^{i-1}_{x,y,z} + (1-\beta)\nabla^2 F^{i-1}_{x,y,z} + \tau\gamma_{x,y,z} \quad (3).$$

where the parameters τ and μ control the stability and growth rate for spreading the vectors into surrounding regions of the scan data.

Two features make GGVF attractive. GGVF conserves the vector field in the regions densely populated with edges (where a magnitude G of gradient field ∇E is large), and GGVF also fills the "deserted" regions with vectors pointing to the nearest edge population.

In step 650, the transformed mesh received in step 632 is used as an initial mesh and refined based on the vector field received as a result of step 642. Each vertex is moved based on the external forces provided by the vector field and internal forces that oppose a large change in the shape of the mesh. After all vertices are adjusted, i.e., after at least some coordinates of some vertices are changed, the internal and external forces are determined again and the vertices are adjusted again. When end conditions are satisfied, the process of step 650 stops. The resulting refined mesh is output as the segmentation boundary for the target scan data. Step 650 is described in more detail in the next section with reference to FIG. 8.

In step 660, the refined mesh is used for whatever purpose the segmentation is directed. A use of the refined mesh for the left ventricle is described in more detail in a later section to determine the left ventricular volume, ejection fraction and other critical clinical indicators of heart function and health.

In step 670 another frame of target scan data is received. In some embodiments that scan data is used to start the same process over in step 620. Note that no change is needed in the reference scan data and reference mesh, the so called dual voxel-wiremesh template. The same reference data received in steps 612 and 614 are used over and over again. No more tedious manual segmentation of a reference scan need be performed.

In some embodiments, the next frame is similar enough to the former frame (e.g., taken a few milliseconds later for a normal heart rate), that the refined mesh produced in step 650 is suitable as the initial mesh to refine based on the new edge data. In these embodiments, shown by the dashed lines, the refined mesh is input back to step 650 as the initial mesh. In these embodiments, the next scan data received in step 670 is input to step 640 and not to step 620, thus bypassing step 630 and step 632, the automatic registration of the reference data to the next frame of target scan data.

Registration assistance proves useful not only for the initial placement of the LV reference mesh for a single frame, but also for propagating the results from frame to frame for segmenting an entire image sequence. Registration was especially useful in the case of high heart rate, when a cardiac cycle contained a small number of frames because of the frame rate of the real-time 3D ultrasound scanners. A direct transfer of the final refined mesh from the current frame to the next (or previous) provides insufficient accuracy in some embodiments because of the contradictory requirements of the desired mesh behavior and the balance of forces. Internal forces should ensure that the mesh is stiff enough to preserve its overall integrity. For example, internal forces should not allow the mesh to expand into the left atrium, even if a segment of the mesh happens to overlap the left atrium initially. At the same time, internal forces should be mild enough (i.e. the mesh should be flexible enough), to track the normal size and shape variations of the LV. Correct initialization of the mesh with the help of inter-frame registration resolves this contradiction in favor of a stiffer deformable model and provides an accurate segmentation in spite of high heart rate and low temporal resolution.

The methods of the present invention can be implemented on any hardware, using any combination of instructions for a programmable processor and logic circuitry, including field programmable gate arrays. The hardware of a general purpose computer, used in some embodiments, is described in a later section.

5. Method for Automated Adjustment of Mesh

Figure 8:
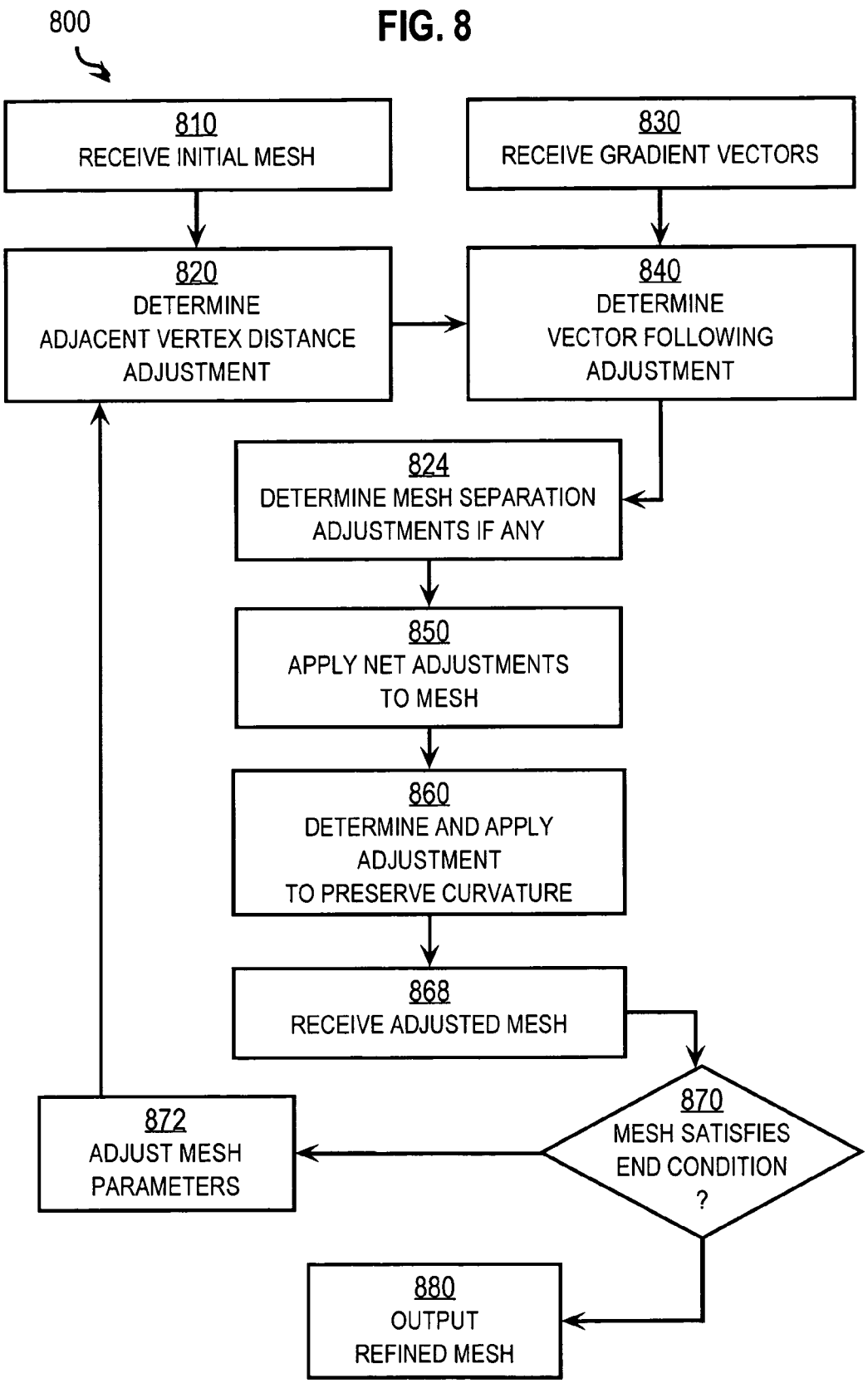
FIG. 8 is a flow diagram that illustrates in more detail a step of FIG. 4 to adjust vertices of a mesh based on edge vectors, according to an embodiment.

FIG. 8 is a flow diagram that illustrates in more detail a step 650 of FIG. 6 to adjust vertices of a mesh based on edge vectors, according to an embodiment 800. The vertices move (i.e., change their coordinates) in response to the edges detected in the target scan data and the constraints on movement placed by internal forces. Any constraints and internal forces known in the art may be used. According to illustrated embodiments of the invention described below, the constraints are defined so as to preserve the shape of the mesh in the absence of an external force. Prior art approaches used internal forces that cause the initial shape to collapse to a circle (or sphere in three dimensions) in the absences of external forces. This is not a desirable result when the physical component depicted in the scan data to be segmented is non-circular, such as the LV of the human heart.

In step 810, the initial mesh is received. As described above, the initial mesh is either the transformed reference mesh or the final mesh that satisfied the end conditions for the previous frame of scan data. In an illustrated embodiment the double mesh derived from the joint epicardial and endocardial boundaries shown in FIG. 7 are transformed in step 632 and are received in step 810.

In the following discussion a vertex is represented by a 3D spatial vector V from an origin of the coordinate system for the mesh, with coordinates Vx, Vy, Vz.

In step 820, contributions to the vertex adjustment for each vertex in the mesh are determined based on distances to adjacent vertices. Those adjustments are not applied to move the vertex until a later step 850, described below. This contribution to the adjustment is one of the internal forces, and is independent of the gradient vectors. This contribution to the adjustment is also called the distance-preserving internal force. Any distance-preserving adjustment can be determined.

In the illustrated embodiment, an improvement is made over the distance-preserving internal force made in prior approaches. In those approaches, this contribution is non-zero whenever the distance between adjacent vertices is different from an ideal rest distance. In the absence of external forces, this causes a 3D mesh to collapse to a sphere.

It is desired in the illustrated embodiment to keep the left ventricular shape of the mesh unchanged in the absence of external forces. An insensitivity zone from dmin to dmax is introduced in which the distance-preserving adjustment is zero; where dmin and dmax bracket the range of edge lengths in the reference mesh, described above with reference to step 614 in FIG. 6. In some embodiments, the insensitivity zone is based on dmin and dmax for the initial mesh, such as the transformed reference mesh, rather than the original untransformed reference mesh. In some embodiments, the zone of insensitivity is based on other measures of the distribution of edge lengths in the reference or initial mesh, such as one or two standard deviations. The specific formulation of the distance-preserving internal forces in the illustrated embodiment does not modify the mesh unless it is also being acted on by the external forces.

Figure 9A:
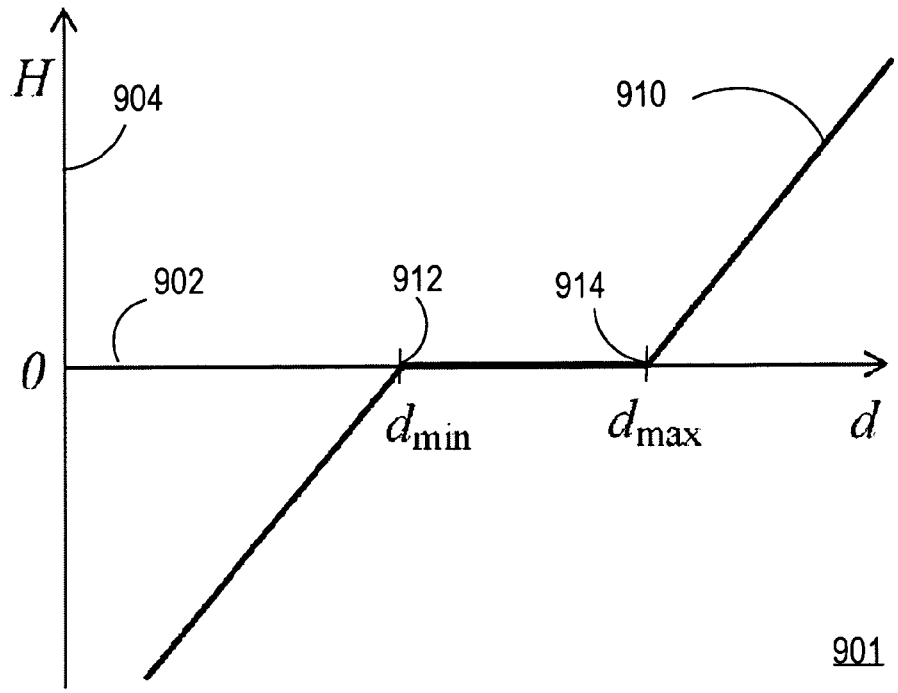
FIG. 9A is a graph that illustrates an edge distance preserving internal component of adjustment; according to an embodiment.

For edge lengths outside the range from dmin to dmax, an adjustment is computed that directs the vertex to restore the edge to this range for each edge with an adjacent vertex. The restoring adjustment is proportional to the deviation from the insensitivity range by a proportionality constant k, which acts like a spring constant for the edge. For a particular vertex Vi under consideration, the form of the distance preserving adjustment is given by Equation 4 for each adjacent vertex Vj of vertex vi.

$$Hij = \begin{cases} k(|Vj-Vi|-dmax)(Vi-Vj)/|Vj-Vi| & \text{for } dmax < |Vj-Vi| \\ 0 & \text{for } dmin < |Vj-Vi| < dmax \\ k(dmin-|Vj-Vi|)(Vj-Vi)/|Vj-Vi| & \text{for } |Vj-Vi| < dmax \end{cases} \quad (4)$$

where Hij is a vector pointing from Vi in a direction of the adjustment along the edge from the vertex to the adjacent vertex. Similar vector adjustment components are computed for all adjacent vectors. Equation 4 is shown graphically in FIG. 9A. FIG. 9A is a graph 901 that illustrates an edge distance preserving internal adjustment; according to an embodiment. The horizontal axis 902 indicates a distance d=|Vj-Vi| from a vertex Vi to one adjacent vertex Vj. The distance dmin 912 and the distance dmax 914 along this axis are indicated. The vertical axis 904 represents the value for an adjustment component directed along this edge, positive is toward Vj, and negative is away from Vj. The trace 910 shows the value of Hij from Equation 4, which is always directed along the line segment between Vi and Vj. Note that there is no adjustment in the insensitivity zone from dmin 912 to dmax 914. The shortening adjustment (Vi moves toward Vj) is proportional to the amount that the distance exceeds dmax and the lengthening adjustment (Vi moves away from Vj) is proportional to the amount that the distance is less than dmin.

In step 830, the gradient vectors determined in step 642 are received.

In step 840, an external force adjustment is determined for each vertex based on the gradient vector Fi at that vertex, where $Fi=F_{xi,yi,zi}$ from Equation 3 after the last iteration.

In step 824 an intermesh separation adjustment component is determined. Step 824 is not known in prior approaches using deformable models. Step 824 is included in the illustrated embodiment to prevent the separation between the joint meshes that represent the myocardium from deviating too far from a reasonable separation. The a priori information about the relative position of the reference endocardial mesh and the reference epicardial mesh (e.g., as shown in FIG. 7A and FIG. 7B) is used to introduce another adjustment component for the internal force called the mesh interaction adjustment, also a three dimensional vector I, that acts on each vertex at every iteration of the mesh refinement process. The mesh interaction adjustment helps overcome the challenges in epicardium detection and make the segmentation more robust to intensity artifacts.

During step 824, the average separation between the endocardial mesh and epicardial mesh is monitored at every iteration. At every vertex, within an iteration, the mesh separation is calculated as the perpendicular distance between the vertex on one mesh and the other mesh. The average separation Da is then calculated by averaging over all the points of the dual meshes. After the calculation of Da, the adjustments are computed for each vertex. If the mesh separation Ds at that vertex falls beyond a predefined tolerance band about the average mesh separation, then a proportional interaction force acts on that vertex so as to oppose the motion of the vertex under the influence of other forces at that iteration. In the illustrated embodiment, the intermesh adjustment is set to oppose the external adjustment determined in step 840 rather than to oppose any internal adjustment determined in step 820. In other embodiments other intermesh adjustments can be made. The intermesh adjustment I is given by Equation 5 and 6.

$$Imaxi = -Fi \quad (5)$$

and $$Ii = \begin{cases} Imaxi & \text{for } Ds < (1-f2)Da \\ Imaxi - Imaxi * [Ds - Da(1-f2)]/[Da(f2-f1)] & \text{for } (1-f2)Da < Ds < (1-f1)Da \\ 0 & \text{for } (1-f1)Da < Ds < (1+f1)Da \\ Imaxi * [Ds - Da(1+f1)]/[Da(f2-f1)] & \text{for } (1+f1)Da < Ds < (1+f2)Da \\ Imaxi & \text{for } (1+f2)Da < Ds \end{cases} \quad (6)$$

where f1 is a first factor of Da that defines the tolerance band, and f2>f1 is a second factor that defines a range of separations for which I is proportional to but less than Imax. To avoid intersecting boundaries it is desirable to set f2<1. Equation 6 is plotted for f1=0.5 and f2=0.8 in FIG. 9B. In the illustrated embodiment, however, f1=f2=0.5.

Figure 9B:
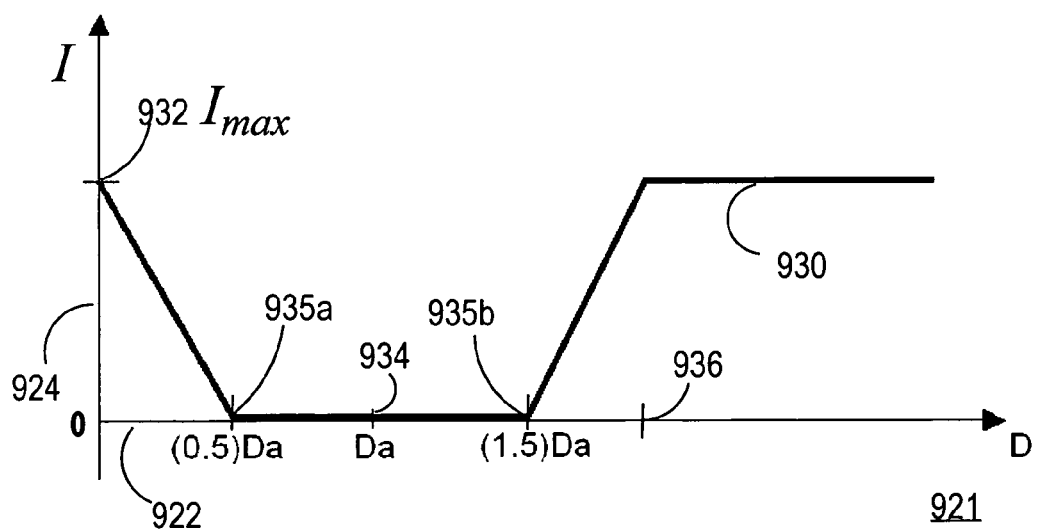
FIG. 9B is a graph that illustrates an intermesh distance preserving internal component of adjustment; according to an embodiment.

FIG. 9B is a graph 921 that illustrates an intermesh distance preserving internal force; according to an embodiment. The horizontal axis 922 indicates a separation distance Ds at a vertex between the mesh that includes the vertex and the other mesh The distance 0.5 Da 935a, the distance Da 934, the distance 1.5 Da 935b and the distance (1+f2) Da 936 along this axis are indicated. The distance 0.5 Da 935a represents (1−f1) Da when f1 is 0.5. Similarly, the distance 1.5 Da 935b represents (1+f1) Da when f1 is 0.5. The vertical axis 924 represents the value for an adjustment component directed opposite to the external force Fi. The value Imax 932 is indicated on vertical axis 924. The trace 930 shows the value of Ii from Equation 6. Note that there is no adjustment in the range from (1−f1) Da 935a to (1+f1) Da 935b. In the illustrated embodiment, f1=f2=0.5 and therefore I equals Imax everywhere outside Da+/−0.5Da. Equation 6 reduces to Equation 7 when f2=f1, as in the illustrated embodiment.

$$Ii = \begin{cases} Imaxi & \text{for } Ds < (1-f1)Da \\ 0 & \text{for } (1-f1)Da < Ds < (1+f1)Da \\ Imaxi & \text{for } (1+f1)Da < Ds \end{cases} \quad (7)$$

The mesh interaction force does not depend on a constant value for the average separation Da between the two meshes, bu, instead, varies as the refinement evolves. So long as the mesh separation measured at any vertex stays within the predefined tolerance zone around the iteration average separation Da, the magnitude of I stays zero. Thus, the mesh interaction force does not depend on the actual value of the average thickness, rather on the variation of the thickness over the entire LV myocardium. By using this formulation, the mesh interaction force is adaptively modulated according to the myocardial thickness for every individual case, as the dual meshes iteratively converge to the actual solution.

As stated above, the maximum possible magnitude of the mesh interaction force, $I_{max}$, at a vertex for a given iteration is calculated based on the magnitude of the external GGVF-derived force acting on the vertex at that iteration. By using this approach, it is ensured that if the mesh separation at a particular vertex falls outside the tolerance band at that particular iteration, the effect of the external GGVF/image intensity-derived force at that vertex at that particular iteration is nullified. In such a scenario, the vertex moves only passively under the influence of the mesh-derived internal forces, which are affected by the movement of the other neighboring vertices. In this sense, the mesh interaction force is more like a damping factor, which modulates the external image intensity-derived force according to the relative mesh separation. The mesh interaction force thus ensures that the relative orientation of endocardial and epicardial meshes is retained and the LV myocardial thickness is maintained within meaningful limits. this helps in avoiding anatomically anomalous results similar to that illustrated by boundary 330 in FIG. 3B In other embodiments, the intermesh adjustment takes other forms appropriate for the relationship to be maintained between the two or more meshes introduced by the reference segmentation data. In embodiments in which only one initial mesh is received, or embodiments in which multiple meshes are allowed to adjust independently, step 824 is omitted.

In step 850 the net adjustment for each vertex based on the adjustments determined in steps 820, 824 and 840 are applied to the vertices. Note that all of those adjustments are computed with the vertices unmoved, the vector sum of the adjustments is determined and the vertex is moved in proportion. In the illustrated embodiment, the vertex response to the net adjustment is controlled by a parameter called mass that can change from one iteration to the next. The mass is a property of the deformable model and the vertices are moved according to the net adjustment divided by the mass. The initial setting of mass is determined in the illustrated embodiment such that it limits the effective vertex displacement to about one inter-voxel separation distance per iteration. In the illustrated embodiment, the mass was gradually increased during later iterations to assist convergence without oscillations.

In step 860, adjustments to preserve curvature are determined and applied. Any curvature preserving procedure may be applied. In an illustrated embodiment, curvature is preserved by applying an adjustment that depend on a spike length SL. Spike length is not used in other known curvature preserving internal forces for deformable models. Spike length SLi at vertex Vi is computed as a deviation from the average position Vai of all the adjacent vertices Vj, j=1 to J, where J is the number of adjacent vertices to vertex Vi, as defined in Equation 8a and 8b.

$$Vai = \Sigma_j Vj/J \quad (8a)$$

$$SLi = |Vai - Vi| \quad (8b)$$

The mesh is smoothed in step 860, after the adjustments are applied in step 850, by shortening the distance between Vi and Vai for each vertex whose spike length exceeds a threshold maximum spike length SLmax. The adjustment is defined in Equation 9.

$$Vi = \begin{cases} Vi & \text{for } SLi \leq SLmax \\ Vi + \lambda * (Vai - Vi) * (SLi - Slmax)/SLi & \text{for } (SLi > SLmax) \end{cases} \quad (9)$$

where λ is a parameter that determines how quickly spikes are smoothed out at each iteration. According to Equation 9, when a mesh is subjected only to the curvature-preserving internal force, the mesh gradually tends to an arrangement in which the spike length at all vertices is no greater than the threshold. This approach also serves to prevent a mesh from collapsing to a sphere in the absence of external forces, thus preserving arbitrary shapes for the mesh, such as the shape of mesh 430. In some embodiments, the threshold SLmax varies from mesh point to mesh point. For example, in some embodiments, SLmax for mesh vertices near the apex 433 of the LV reference mesh 430 is greater than at other vertices, to preserve the desired shape of the apex.

In step 868 the adjusted mesh from the current iteration is received. Zero or more vertices of the mesh have received new coordinates as a result of the adjustments. In some embodiments, step 868 includes merging vertices that have moved too close together and inserting vertices along edges that have become too long. Control then passes to step 870.

In step 870 it is determined whether the adjusted mesh satisfies end conditions for the refinement process. Any end conditions may be tested. In the illustrated embodiment, the end condition is satisfied when none of the vertices move by more than a user-defined threshold distance or when a predefined maximum number of iterations is reached. If, the adjusted mesh does not satisfy end conditions, control passes to step 872. In step 872, mesh parameters are adjusted. For example, the mass used in step 850 is adjusted. Control then returns to step 820 to repeat the process for the adjusted mesh.

If it is determined, in step 870, that the adjusted mesh satisfies end conditions for the refinement process, then control passes to step 880 to output the refined mesh (or multiple meshes) as the refined segmentation boundary data.

Figures 10A, 10B:
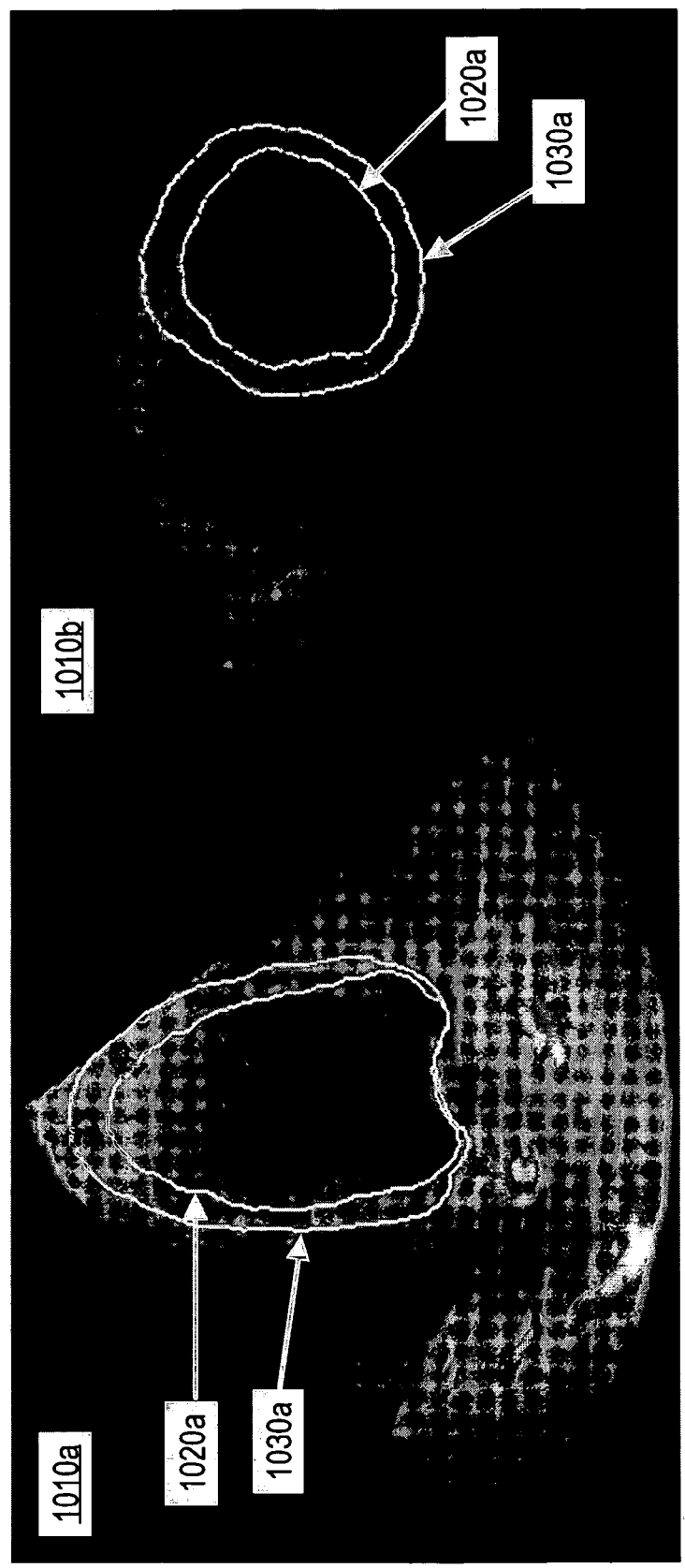
FIG. 10A and FIG. 10B are diagrams that illustrate two automatically generated boundaries in each of two images that represent slices through 3D target scan data (target frame), according to an embodiment.

FIG. 10A and FIG. 10B are diagrams that illustrate two automatically generated boundaries in each of two images 1010a, 1010b that represent slices through 3D target scan data (target frame), according to an embodiment. FIG. 10A shows endocardial boundary 1020a from the refined endocardial mesh in the plane of the first slice and FIG. 10B shows endocardial boundary 1020b from the refined endocardial mesh in the plane of the second slice. Similarly, FIG. 10A shows epicardial boundary 1030a from the refined epicardial mesh in the plane of the first slice and FIG. 10B shows epicardial boundary 1030b from the refined epicardial mesh in the plane of the second slice.

FIG. 10A and FIG. 10B show typical results. It is noted that the relative orientation of both surfaces and reasonable thickness of the myocardium are maintained, even in the vicinity of the high intensity artifact near the apex of the measurement pyramid. By introducing adaptive interaction forces between endocardial and epicardial meshes, both are simultaneously refined, while maintaining appropriate relative orientation. By implementing segmentation of complete LV myocardium (endocardium+epicardium), it is possible to accurately monitor clinically important structural parameters like LV wall thickness and strain in addition to parameters like LV volume, ejection fraction and 3D excursion.

6. Example Applications of the Automated Segmentation

The automatic methods of FIG. 6 and FIG. 8 have been performed to operate on test data sets to demonstrate the accuracy of the automatic approach compared to the slow and tedious manual segmentation by an expert.

6.1 Example Automated Segmentation of Myocardium

Five real-time 3D echo image sequences were used, all acquired using the SONOS 7500 scanner. The scanner produced a sequence of pyramid-shaped volumetric images at frame rates of 20 Hz, and the actual number of frames per sequence depended on the heart rate and varied from 10 to 22 for the data sets used. All five data sets were acquired from the apical direction. Each frame of a 3D image sequence was scan converted and median filtered. Each pre-processed frame was then used for edge detection and generation of a GGVF. The reference scan data (slices shown as 710a and 710b) was globally registered with the end-diastolic frame, and the resultant transformation was applied to the dual reference meshes (slices shown as 720a and 730a) for initialization within the frame. Subsequently, the transformed mesh underwent iterative local refinement under the influence of external, internal and mesh interaction forces; and, upon convergence, provided dual 3D meshes modeling the LV myocardium. The final refined mesh of a given frame was used as the initial mesh for the next frame, and so on, until the entire sequence is segmented.

FIG. 11A is a diagram that illustrates a manually generated boundary 1112 for a physical component on a slice 1110 through a 3D target frame and a slice 1120 of an automatically generated 3D boundary, according to an embodiment. FIG. 11B is a diagram that illustrates a different manually generated boundary 1113 for a physical component on the same slice through the same 3D target frame and a corresponding slice 1130 of an automatically generated 3D boundary, according to an embodiment. FIG. 11A and FIG. 11B depict a typical example for visual comparison of the automatic segmentation and the expert segmentation for endocardial and epicardial contours. An overall agreement between the corresponding automatic and expert-traced contours is evident; any mismatch led to the variability presented below, in Table 1. The agreement is good, within a few millimeters (mm. 1 mm=$10^{-3}$ meters)

TABLE 1

Root means square (RMS) distance metric between expert and automatic segmentation

| Subject | RMS error for end-diastolic frame (mm) | | RMS error for end-systolic frame (mm) | | RMS error averaged for end-diastolic and end-systolic frames (mm) | |
|---|---|---|---|---|---|---|
| | Endo-cardium | Epi-cardium | Endo-cardium | Epi-cardium | Endo-cardium | Epi-cardium |
| 1 | 3.5 | 3.7 | 3.7 | 3.8 | 3.6 | 3.7 |
| 2 | 4.7 | 4.9 | 4.8 | 5.0 | 4.8 | 5.0 |
| 3 | 2.9 | 4.4 | 3.6 | 4.4 | 3.3 | 4.4 |
| 4 | 4.4 | 3.6 | 3.7 | 3.4 | 4.1 | 3.5 |
| 5 | 3.8 | 3.4 | 3.7 | 3.6 | 3.8 | 3.5 |
| Avg. | 3.86 ± 0.72 | 4.0 ± 0.63 | 3.9 ± 0.51 | 4.04 ± 0.65 | 3.92 ± 0.57 | 4.02 ± 0.66 |

Table 2 provides a comparison between the clinical parameters calculated using the automated segmentation and expert segmentation of the LV myocardium. The average myocardial thickness was calculated from the planar views that were used for comparison presented in Table 1. The variability in myocardial thickness between expert and automated segmentation for each case in Table 2 is of the order of 10%. Table 2 also provides the absolute difference between LV volumes calculated using the illustrated automatic segmentation and by the expert using a commercially available software package (TOMTEC IMAGING SYSTEMS, Munich, Germany) for LV analysis in 3D echocardiographic images for the end-diastolic and systolic frames, and also the absolute difference in ejection fraction.

TABLE 3

RMS distance metric comparing expert-traced contours with automatic determined contours, with (+) and without (−) mesh interaction force.

| Subject | RMS error for endocardial contours (mm) | | RMS error for epicardial contours (mm) | |
|---|---|---|---|---|
| | + | − | + | − |
| 1 | 3.6 | 3.5 | 3.7* | 5.7* |
| 2 | 4.8 | 5.1 | 5.0* | 8.0* |
| 3 | 3.3 | 3.4 | 4.4* | 6.8* |
| 4 | 4.1 | 3.8 | 3.5* | 5.3* |
| 5 | 3.8 | 3.7 | 3.5 | 3.7 |

*$p < 0.05$

TABLE 2

Comparison of clinical LV parameters from expert and automatic LV myocardial segmentation.

| Subject | Absolute difference in myocardial thickness | | | Absolute difference in LV volumetric parameters | | |
|---|---|---|---|---|---|---|
| | Apical (mm) | Mid (mm) | Basal (mm) | End-diastolic volume (ml) | End-systolic volume (ml) | Ejection fraction (%) |
| 1 | 1.4 | 1.2 | 1.4 | 9 | 10 | 8 |
| 2 | 2.4 | 2.2 | 2.2 | 10 | 12 | 8 |
| 3 | 1.9 | 1.1 | 1.3 | 8 | 9 | 7 |
| 4 | 1.6 | 1.4 | 1.4 | 5 | 7 | 6 |
| 5 | 0.9 | 0.6 | 1.0 | 8 | 6 | 7 |
| Avg. | 1.64 ± 0.56 | 1.3 ± 0.58 | 1.46 ± 0.45 | 8 ± 1.87 | 8.8 ± 2.39 | 7.2 ± 0.84 |

To analyze the effectiveness of the mesh interaction forces for accurate myocardial segmentation, the mesh refinement step for all cases was repeated with the mesh interaction adjustment disabled. Table 3 summarizes the differences between the automatic and expert-traced contours in the absence of mesh interaction forces. The t-test analysis indicates statistically significant difference between the two approaches for epicardium contours (4 of 5 cases), but no significant difference for the endocardium contours. The results suggest that the mesh interaction force is beneficial for epicardium segmentation, but less so for endocardium segmentation.

6.2 Example Automated Segmentation of Endocardium

Echocardiographic images were obtained from two different real-time 3D ultrasound scanners, one manufactured by VOLUMETRICS, INC. (Durham, N.C.), and another (model SONOS 7500) manufactured by PHILIPS MEDICAL SYSTEMS (Andover, Mass.). These scanners produced a sequence of pyramid-shaped volumetric images at frame rates of 25 Hz (Volumetrics) and 20 Hz (Philips). The actual number of frames per sequence depended on the heart rate and varied from 10 to 22 for the data sets used.

Ten data sets from 10 different subjects, both healthy and diseased, were used. Five data sets were acquired using the VOLUMETRICS scanner and the other five using the PHILIPS scanner. All 10 data sets were acquired from the apical direction.

Each frame of an echocardiographic sequence (irrespective of the scanner used) was scan converted, median filtered, and sub-sampled to 128×128×128 voxels to achieve reasonable execution times. Each pre-processed frame was then used for edge detection and generation of a GGVF. The reference scan data was globally registered with the end-diastolic frame (usually the first in the sequence), and the resultant transformation was applied to the reference mesh for the endocardial surface for initialization of the mesh refinement step within the frame. Subsequently, the mesh underwent iterative local refinement under the influence of external and internal forces and, upon convergence, provided a 3D mesh that serves as a 3D surface model of the left ventricular endocardium.

All reported algorithms were implemented in C++, while OpenGL was used for the visualization tasks. Execution times recorded on a dual 1.7 GHz Pentium computer were as follows. The MI-based registration involving $128^3$-voxel template took approximately 3 minutes. The generation of the GGVF (100 iterations, each lasting 5 seconds) consumed approximately 8 minutes for scan data with $128^3$ voxels. Iterative refinement of the wiremesh was typically 30 seconds long for the endocardial mesh made up of 1087 vertices, 3258 edges and 2171 faces. The dual-processor workstation permitted simultaneous execution of segmentation and visualization using separate threads on the two processors. Similar computation times would be expected if the segmentation were to be performed by itself on a single-processor workstation.

Application of the above-described segmentation procedure generates a sequence of endocardial meshes that captures the dynamic shape of the left ventricular endocardium throughout a cardiac cycle. Using this dynamic shape of the LV, clinically important global and local function parameters were measured. Global function parameters, like stroke volume and ejection fraction, were computed directly from the endocardial mesh volumes. Extraction of the local wall-motion parameters of the LV from such a shape sequence is also possible.

This embodiment of the automatic segmentation algorithm was validated by comparing its results with a set of planar contours traced by an expert echocardiologist in two frames (diastolic and systolic) selected from each of the 10 data sets. For each frame, manual contours were drawn on a set of reformatted planar views. A predetermined set of six planes were used, forming a fan with 30 degrees of angular separation between adjacent planes. The common axis of the fan of planes was aligned along the central axis of the ultrasound pyramid, roughly approximating the long axis of the LV. Thus, the fan of planes was attached neither to the reference mesh nor to the LV axis, providing no loss of generality with respect to the whole shape that is extremely hard to trace manually. The intersections of the segmented wiremesh with the six reformatted views produced the corresponding automatic contours, which were compared with expert-traced contours.

Table 4 list RMS differences between expert and automatic segmentation for different frames and different initialization approaches to test the accuracy of the automatic segmentation. To evaluate the variability between automated and expert segmentation in relation to the intra-observer variability, the same expert echocardiologist redrew the same contours several days later on one of the data sets. The intra-observer variability was 2.6 mm, comparable to the automatic segmentation to expert segmentation variability presented in Table 4.

TABLE 4

Root means square (RMS) distance metric between expert and automatic segmentation of endocardium

| Subject | RMS error for end diastolic frame (mm) | RMS error for systolic frame (mm) | RMS error for systolic frame without registration assistance (mm) |
| --- | --- | --- | --- |
| 1 | 2.8 | 2.0 | 2.7 |
| 2 | 2.9 | 3.9 | 5.3 |
| 3 | 2.8 | 2.8 | 3.9 |
| 4 | 3.9 | 3.6 | 6.2 |
| 5 | 2.7 | 4.2 | 5.5 |
| 6 | 3.3 | 2.6 | 4.7 |
| 7 | 3.6 | 3.1 | 5.2 |
| 8 | 3.2 | 2.4 | 4.2 |
| 9 | 2.8 | 3.3 | 2.5 |
| 10 | 2.8 | 3.2 | 3.9 |
| Avg. | 3.08 ± 0.41 | 3.11 ± 0.68 | 4.41 ± 1.20 |

Table 4 also shows in the last column whether re-initialization of the initial DM through an explicit registration of the neighboring frames improved segmentation accuracy in motion tracking. As before, the distance metric between automatic segmentation and expert-segmentation was determined for a systolic frame, located approximately midway in the sequence. The results suggest that explicit registration assistance helped frame-by-frame segmentation and improved accuracy. Explicit registration assistance handled significant scale variations and intensity dropouts between neighboring frames better than the default method in these data sets.

Figure 12A:
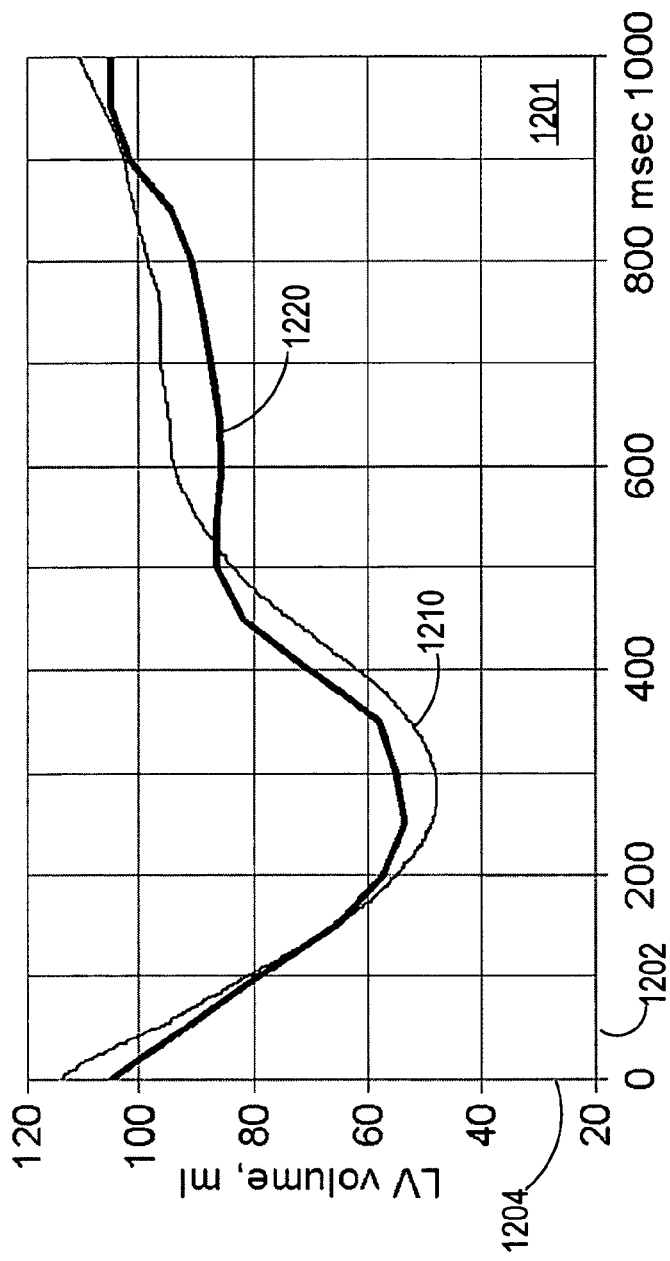
FIG. 12A is a graph that illustrates left ventricle volume deduced from boundaries that represent an endocardial surface of a left ventricle, according to an embodiment.

FIG. 12A is a graph 1201 that illustrates left ventricle volume deduced from boundaries that represent an endocardial surface of a left ventricle, according to an embodiment. The horizontal axis 1202 represents time in milliseconds. The vertical axis 1204 represents LV volume in milliliters (ml, 1 ml=$10^{-3}$ liters). Trace 1210 indicates volume variations with frame of scan data deduced from expert segmentation. Trace 1220 indicates volume variations with frame of scan data produced by the automatic segmentation. FIG. 12 B is a diagram that illustrates a time sequence of automatically generated mesh boundaries that represent the endocardial surface upon which trace 1220 in FIG. 12A is based, according to an embodiment. The sequence of endocardial meshes 1230a, 120b, 1230c, 1230d, 1230e, 1230f (collectively referenced hereinafter as endocardial mesh 1230) are shown in perspective view and separated to the right with increasing time.

Figure 12B:
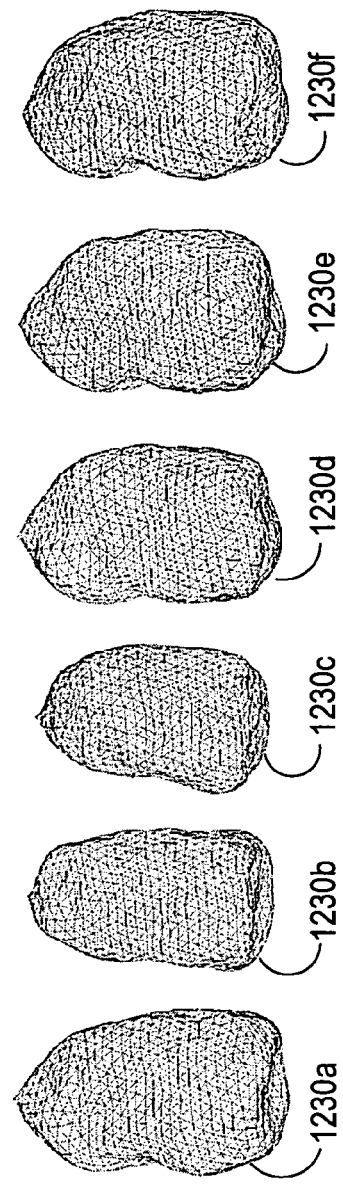
FIG. 12 B is a diagram that illustrates a time sequence of automatically generated mesh boundaries that represent the endocardial surface upon which one trace in FIG. 12A is based, according to an embodiment.

FIG. 12 is a typical example of 3D segmentation results over several frames that span the cardiac cycle. The LV volume/time plots in FIG. 12A are accompanied by automatically segmented LV shapes at different phases of the cardiac cycle in FIG. 12B. For this specific case (#9), end-diastolic volume (EDV) was 104 ml and end-systolic volume (ESV) was 53 ml according to automatic segmentation, whereas the expert LV reconstruction using TOMTEC software estimated EDV as 113 ml and ESV as 48 ml. Therefore, the stroke volume (SV), given by (EDV-ESV), was 51 ml for automatic segmentation and 65 ml for expert reconstruction, and the corresponding ejection fraction (EF) was 49% and 57%, respectively. The automatic segmentation algorithm underestimated EF in comparison with expert reconstruction in this specific case, and this was a common trend for images acquired by the PHILIPS scanner as indicated in Table 5, below. An opposite trend toward overestimating EF was observed for images acquired by the VOLUMETRICS scanner.

TABLE 5

LV Volume differences between automated and expert segmentation.

| Subject | LV volume difference for diastolic frame (mm) | LV volume difference for systolic frame (mm) | Ejection Fraction difference (%) |
|---|---|---|---|
| 1 | 19 | 1 | 10 |
| 2 | 30 | −10 | 22 |
| 3 | −6 | −8 | 3 |
| 4 | −40 | −39 | 5 |
| 5 | 21 | 4 | 6 |
| 6 | −8 | 7 | −8 |
| 7 | −25 | −13 | −3 |
| 8 | −5 | 7 | −6 |
| 9 | −9 | 5 | −8 |
| 10 | 12 | 4 | 5 |
| Avg | 17.5 (+/−) 11.6 | 9.8 (+/−) 10.8 | 7.6 (+/−) 5.5 |

A reasonable benchmark for acceptable performance of automatic evaluation of global LV parameters is the inter-observer variability. For real-time 3D echocardiography, 8.3% inter-observer variability and 3.7% intra-observer variability has been reported in LV EF measurement. Comparison with the validation results summarized in Table 5 suggests that the illustrated automatic segmentation performs within the acceptable limits.

7. General Purpose Computer Overview

FIG. 1 is a block diagram that illustrates a computer system 100 upon which an embodiment of the invention may be implemented. Computer system 100 includes a communication mechanism such as a bus 110 for passing information between other internal and external components of the computer system 100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 110 includes many parallel conductors of information so that information is transferred quickly among devices coupled to the bus 110. One or more processors 102 for processing information are coupled with the bus 110. A processor 102 performs a set of operations on information. The set of operations include bringing information in from the bus 110 and placing information on the bus 110. The set of operations also typically include comparing two or more units of information, shifting positions of units of information, and combining two or more units of information, such as by addition or multiplication. A sequence of operations to be executed by the processor 102 constitute computer instructions.

Computer system 100 also includes a memory 104 coupled to bus 110. The memory 104, such as a random access memory (RAM) or other dynamic storage device, stores information including computer instructions. Dynamic memory allows information stored therein to be changed by the computer system 100. RAM allows a unit of information stored at a location called a memory address to be stored and retrieved independently of information at neighboring addresses. The memory 104 is also used by the processor 102 to store temporary values during execution of computer instructions. The computer system 100 also includes a read only memory (ROM) 106 or other static storage device coupled to the bus 110 for storing static information, including instructions, that is not changed by the computer system 100. Also coupled to bus 110 is a non-volatile (persistent) storage device 108, such as a magnetic disk or optical disk, for storing information, including instructions, that persists even when the computer system 100 is turned off or otherwise loses power.

Information, including instructions, is provided to the bus 110 for use by the processor from an external input device 112, such as a keyboard containing alphanumeric keys operated by a human user, or a sensor. A sensor detects conditions in its vicinity and transforms those detections into signals compatible with the signals used to represent information in computer system 100. Other external devices coupled to bus 110, used primarily for interacting with humans, include a display device 114, such as a cathode ray tube (CRT) or a liquid crystal display (LCD), for presenting images, and a pointing device 116, such as a mouse or a trackball or cursor direction keys, for controlling a position of a small cursor image presented on the display 114 and issuing commands associated with graphical elements presented on the display 114.

In the illustrated embodiment, special purpose hardware, such as an application specific integrated circuit (IC) 120, is coupled to bus 110. The special purpose hardware is configured to perform operations not performed by processor 102 quickly enough for special purposes. Examples of application specific ICs include graphics accelerator cards for generating images for display 114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 100 also includes one or more instances of a communications interface 170 coupled to bus 110. Communication interface 170 provides a two-way communication coupling to a variety of external devices that operate with their own processors, such as printers, scanners and external disks. In general the coupling is with a network link 178 that is connected to a local network 180 to which a variety of external devices with their own processors are connected. For example, communication interface 170 may be a parallel port or a serial port or a universal serial bus (USB) port on a personal computer. In some embodiments, communications interface 170 is an integrated services digital network (ISDN) card or a digital subscriber line (DSL) card or a telephone modem that provides an information communication connection to a corresponding type of telephone line. In some embodiments, a communication interface 170 is a cable modem that converts signals on bus 110 into signals for a communication connection over a coaxial cable or into optical signals for a communication connection over a fiber optic cable. As another example, communications interface 170 may be a local area network (LAN) card to provide a data communication connection to a compatible LAN, such as Ethernet. Wireless links may also be implemented. For wireless links, the communications interface 170 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 102, including instructions for execution. Such a medium may take many forms, including, but not limited to, non-volatile media, volatile media and transmission media. Non-volatile media include, for example, optical or magnetic disks, such as storage device 108. Volatile media include, for example, dynamic memory 104. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 178 typically provides information communication through one or more networks to other devices that use or process the information. For example, network link 178 may provide a connection through local network 180 to a host computer 182 or to equipment 184 operated by an Internet Service Provider (ISP). ISP equipment 184 in turn provides data communication services through the public, world-wide packet-switching communication network of networks now commonly referred to as the Internet 190. A computer called a server 192 connected to the Internet provides a service in response to information received over the Internet. For example, server 192 provides information representing video data for presentation at display 114.

The invention is related to the use of computer system 100 for implementing the techniques described herein. According to one embodiment of the invention, those techniques are performed by computer system 100 in response to processor 102 executing one or more sequences of one or more instructions contained in memory 104. Such instructions, also called software and program code, may be read into memory 104 from another computer-readable medium such as storage device 108. Execution of the sequences of instructions contained in memory 104 causes processor 102 to perform the method steps described herein. In alternative embodiments, hardware, such as application specific integrated circuit 120, may be used in place of or in combination with software to implement the invention. Thus, embodiments of the invention are not limited to any specific combination of hardware and software.

The signals transmitted over network link 178 and other networks through communications interface 170, which carry information to and from computer system 100, are exemplary forms of carrier waves. Computer system 100 can send and receive information, including program code, through the networks 180, 190 among others, through network link 178 and communications interface 170. In an example using the Internet 190, a server 192 transmits program code for a particular application, requested by a message sent from computer 100, through Internet 190, ISP equipment 184, local network 180 and communications interface 170. The received code may be executed by processor 102 as it is received, or may be stored in storage device 108 or other non-volatile storage for later execution, or both. In this manner, computer system 100 may obtain application program code in the form of a carrier wave.

Various forms of computer readable media may be involved in carrying one or more sequence of instructions or data or both to processor 102 for execution. For example, instructions and data may initially be carried on a magnetic disk of a remote computer such as host 182. The remote computer loads the instructions and data into its dynamic memory and sends the instructions and data over a telephone line using a modem. A modem local to the computer system 100 receives the instructions and data on a telephone line and uses an infra-red transmitter to convert the instructions and data to an infra-red signal, a carrier wave serving as the network link 178. An infrared detector serving as communications interface 170 receives the instructions and data carried in the infrared signal and places information representing the instructions and data onto bus 110. Bus 110 carries the information to memory 104 from which processor 102 retrieves and executes the instructions using some of the data sent with the instructions. The instructions and data received in memory 104 may optionally be stored on storage device 108, either before or after execution by the processor 102.

8. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for segmenting significant regions in measurements of a target body, comprising the steps of:
   receiving reference data comprising a plurality of values each associated with a plurality of coordinate values for spatial or temporal dimensions based on a first measurement mode of a reference body;
   receiving reference segmentation data comprising a plurality of coordinate values for spatial or temporal dimensions for each vertex in a plurality of vertices that indicates a boundary of a physical component of the reference body in the same coordinate frame as the reference measured data;
   receiving target data comprising a plurality of values each associated with a plurality of coordinate values for spatial or temporal dimensions based on a second measurement mode of a target body;
   automatically determining a particular transformation to maximize a similarity measure between the reference data and the target data;
   transforming the reference segmentation data using the particular transformation to produce transformed segmentation data that indicates in the target data a boundary of the physical component of the target body, and
   adjusting a coordinate for a vertex of the transformed segmentation data based on a plurality of gradients in values of the target data in a vicinity of the vertex.

2. A method as recited in claim 1, said step of determining a particular transformation further comprising determining a particular transformation to maximize a mutual information (MI) similarity measure between the reference data and the target data.

3. A method as recited in claim 1, wherein the first measurement mode and the second measurement mode use the same sensing system but at different times.

4. A method as recited in claim 1, wherein the first measurement mode and the second measurement mode use different sensing systems.

5. A method as recited in claim 1, wherein the reference body is the same as the target body.

6. A method as recited in claim 1, said step of receiving reference data further comprising receiving reference data comprising a plurality of average values each associated with a plurality of coordinate values for spatial or temporal dimensions based on a first measurement mode of a plurality of reference bodies.

7. A method as recited in claim 1, said step of determining a particular transformation further comprising determining a non-rigid body spatial transformation.

8. A method as recited in claim 1, said step of determining a non-rigid body spatial transformation including at least one of a dimension-independent scale change, a dimension-dependent scale change, and a shear.

9. A method as recited in claim 1, wherein the target data is three dimensional CT data.

10. A method as recited in claim 9, wherein the physical component is healthy lung tissue of a human patient.

11. A method as recited in claim 1, the method further comprising:
receiving different target data comprising a plurality of values each associated with a plurality of coordinate values for spatial or temporal dimensions based on a third measurement mode of the target body;
determining a second transformation to maximize the similarity measure between the target data and the different target data; and
transforming the transformed segmentation data using the second transformation to produce different transformed segmentation data that indicates in the different target data the boundary of the physical component of the target body.

12. A method as recited in claim 1, said step of adjusting the coordinate further comprising the steps of:
deriving a vector field that points toward high gradient coordinates in the target data which represent edges in the target data; and
adjusting the coordinate based on the vector field.

13. A method as recited in claim 12, said step of deriving the vector field further comprising the step of applying a generalized gradient vector field (GGVF) process that iteratively grows from an initial vector field based on edge detection in the target data to the vector field by filling regions of low amplitude edges with vectors that point to a region of large amplitude edges.

14. A method as recited in claim 13, said step of applying the GGVF process further comprising applying the GGVF process in three dimensions.

15. A method as recited in claim 1, said step of adjusting the coordinate further comprising adjusting the coordinate based on gradients in the vicinity that are reduced to equal a predetermined maximum gradient.

16. A method as recited in claim 1, wherein:
the method further comprises determining reference range data that indicates a distribution of distances between adjacent vertices among all pairs of adjacent vertices in the plurality of vertices that indicates the boundary of the physical component in the reference body;
said step of adjusting the coordinate further comprising
determining a current distance from the vertex to an adjacent vertex of the first plurality of vertices,
determining whether the current distance is within a range of distances based on the reference range data; and
if it is determined that the current distance is not within the range of distances, then determining an edge length adjustment proportional to a difference between the distance and the range of distances.

17. A method as recited in claim 16, said step of adjusting the coordinate for the vertex further comprising, if it is determined that the current distance is within the range of distances, then performing the step of determining an edge length adjustment of zero, whereby after all adjustments in an absence of higher gradients, the plurality of vertices form a non-circular shape in at least one plane.

18. A method as recited in claim 16, said step of determining an edge length adjustment proportional to a difference between the distance and the range of distances further comprising determining a proportionality factor equal to a ratio between the current distance and a maximum possible gradient in the target data.

19. A method as recited in claim 18, wherein the maximum possible gradient in the target data is a difference between a first value indicating white and a second value indicating black in the target data.

20. A method as recited in claim 1, said step of adjusting the coordinate further comprising the steps of:
determining whether a curvature of a plurality of vertices in a neighborhood of the vertex deviates from a predetermined curvature by a threshold amount; and
if it is determined that the curvature deviates from the predetermined curvature by more than the threshold amount, then changing a coordinate of the vertex to change the curvature toward the predetermined curvature,
wherein the predetermined curvature varies among the plurality of vertices to conform to a non-spherical model shape for the physical component.

21. A method as recited in claim 1, said step of adjusting the coordinate further comprising the steps of:
computing a spike distance between a position of the vertex and an average position of adjacent vertices,
determining whether the spike distance exceeds a threshold spike distance, and
if it is determined that the spike distance exceeds the threshold spike difference, then changing a coordinate of the vertex to position the vertex closer to the average position by an amount that depends on a constant spike correction factor.

22. A method as recited in claim 12, said step of adjusting the coordinate further comprising adjusting the coordinate of the vertex at one step by no more than a spatial distance between measured values in the target data.

23. A method as recited in claim 1, the method further comprising repeating said step of adjusting a coordinate until adjusted segmentation data comprising the plurality of vertices that indicates the boundary satisfies an end condition relative to the target data.

24. A method as recited in claim 23, wherein:
the second measurement mode of the target body is performed at a start time; and
the method further comprises the steps of
receiving different target data comprising a plurality of values each associated with a plurality of coordinate values for spatial or temporal dimensions based on a third measurement mode of the target body performed at different time close to a first time compared to a time interval over which the boundary moves within the target body; and
adjusting a coordinate for a particular vertex of the adjusted segmentation data based on a plurality of gradients in values of the different target data in a vicinity of the particular vertex.

25. A method as recited in claim 1, wherein:
said step of receiving reference segmentation data further comprising receiving a second plurality of coordinate values for spatial or temporal dimensions for each vertex in a second plurality of vertices that indicates a second boundary of a second physical component of the reference body in the same coordinate frame as the reference measured data; and
said step of adjusting the coordinate for the vertex of the transformed segmentation data further comprises the steps of
determining a local separation distance from the vertex to the second boundary,
adjusting the coordinate based on the local separation distance.

26. A method as recited in claim 25, said step of adjusting the coordinate of the vertex based on the distance between the vertex and the second vertex further comprising the steps of:
determining an average boundary separation distance between the plurality of vertices that indicates the boundary and the second plurality of vertices that indicate the second boundary;
determining a gradient adjustment based on the higher gradient of the target data;
determining whether the local separation distance is within a particular percentage of the average separation distance; and
if it is determined that the local separation distance is not within the particular percentage, then canceling the gradient adjustment.

27. A method as recited in claim 25, wherein the boundary is an epicardial boundary of a heart in the reference body and the second boundary is an endocardial boundary of a heart in the reference body.

28. A method as recited in claim 27, wherein the first measurement mode is an echocardiogram and the second measurement mode is a different echocardiogram.

29. A method as recited in claim 1, wherein the first measurement mode is an echogram and the second measurement mode is a different echogram.

30. A method for segmenting significant regions in measurements of a target body, comprising the steps of:
receiving reference segmentation data comprising
a plurality of coordinate values for spatial or temporal dimensions for each vertex in a first plurality of vertices that indicates a first boundary of a myocardial wall of a body, and
a second plurality of coordinate values for spatial or temporal dimensions for each vertex in a second plurality of vertices that indicates a second boundary of the myocardial wall of the body;
receiving target data comprising a plurality of values each associated with a plurality of coordinate values for spatial or temporal dimensions based on a measurement mode of the body; and
adjusting a coordinate for a first vertex of the first plurality of vertices toward a higher gradient in values of the target data in a vicinity of the first vertex, comprising the steps of
determining a local separation distance from the first vertex to the second boundary,
adjusting the coordinate based on the local separation distance.

31. A method as recited in claim 30, said step of adjusting the coordinate of the first vertex based on the local separation distance further comprising:
determining an average boundary separation distance between the first plurality of vertices that indicates the first boundary and the second plurality of vertices that indicate the second boundary;
determining a gradient adjustment based on the higher gradient of the target data;
determining whether the local separation distance is within a particular percentage of the average separation distance; and
if it is determined that the local separation distance is not within the particular percentage, then canceling the gradient adjustment.

32. A method as recited in claim 31, wherein the first boundary is an epicardial boundary of a heart in the reference body and the second boundary is an endocardial boundary of a heart in the reference body.

33. A method as recited in claim 32, wherein the measurement mode is an echocardiogram.

34. A method as recited in claim 32, wherein the measurement mode is a computer aided tomography (CT) cardiogram.

35. A method for segmenting significant regions in measurements of a target body, comprising the steps of:
receiving reference segmentation data comprising a plurality of coordinate values for spatial or temporal dimensions for each vertex in a plurality of vertices that indicates a boundary of a physical component of a body;
receiving target data comprising a plurality of values each associated with a plurality of coordinate values for spatial or temporal dimensions based on a measurement mode of the body; and
adjusting a coordinate for a vertex of the plurality of vertices toward a higher gradient in values of the target data in a vicinity of the vertex, further comprising the steps of
computing a measure of curvature at the vertex,
determining whether the measure of curvature exceeds a threshold curvature, and
if it is determined that the measure of curvature exceeds the threshold curvature, then changing a coordinate of the vertex to reduce the measure of curvature,
whereby after all adjustments in an absence of a higher gradient, the plurality of vertices form a non-circular shape in at least one plane.

36. A method as recited in claim 35, wherein:
the measure of curvature is a spike distance between a position of the vertex and an average position of adjacent vertices;
the threshold curvature is a threshold spike distance; and
said step of changing a coordinate of the vertex to reduce the measure of curvature includes changing a coordinate of the vertex to position the vertex closer to the average position by an amount that depends on a spike correction factor.

37. A method as recited in claim 36, wherein the spike correction factor is a constant that has a value less than 1 for all vertices of the plurality of vertices.

38. A method as recited in claim 36, wherein the threshold spike distance is not constant for the plurality of vertices.

39. A method for segmenting significant regions in measurements of a target body, comprising the steps of:
receiving segmentation data comprising a plurality of coordinate values for spatial or temporal dimensions for each vertex in a plurality of vertices that indicates a boundary of a physical component of a body;

receiving target data comprising a plurality of values each associated with a plurality of coordinate values for spatial or temporal dimensions based on a measurement mode of the body; and adjusting a coordinate for a vertex of the plurality of vertices toward a higher gradient in values of the target data in a vicinity of the vertex, further comprising deriving a vector field that points toward high gradient coordinates in the target data which represent edges in the target data based on applying in three dimensions a generalized gradient vector field (GGVF) process that iteratively grows from an initial vector field based on edge detection in the target data to the vector field by filling regions of low amplitude edges with vectors that point to a region of large amplitude edges; and adjusting the coordinate based on the vector field.

40. A method for segmenting significant regions in measurements of a target body, comprising the steps of:

receiving reference range data that indicates a distribution of distances between adjacent vertices among all pairs of adjacent vertices in a reference plurality of reference vertices that indicates a reference boundary of a physical component in a reference body;

receiving segmentation data comprising a plurality of coordinate values for spatial or temporal dimensions for each vertex in a particular plurality of vertices that indicates a particular boundary of the physical component of a particular body;

receiving target data comprising a plurality of values each associated with a plurality of coordinate values for spatial or temporal dimensions based on a measurement mode of the particular body; and adjusting a coordinate for a vertex of the particular plurality of vertices toward a higher gradient in values of the target data in a vicinity of the vertex, comprising the steps of determining a distance from the vertex to an adjacent vertex of the first plurality of vertices, determining whether the distance is within a range of distances based on the reference range data, and if it is determined that the distance is not within the range of distances, then determining an edge length adjustment proportional to a difference between the distance and the range of distances.

41. A method as recited in claim 40, said step of adjusting the coordinate for the vertex further comprising, if it is determined that the distance is within the range of distances, then performing the step of determining an edge length adjustment of zero, whereby after all adjustments in an absence of higher gradients, the plurality of vertices form a non-circular shape in at least one plane.

42. A method as recited in claim 40, wherein:

said step of receiving reference range data further comprises receiving reference range data that indicates a minimum distance and a maximum distance between adjacent vertices among all pairs of adjacent vertices in the reference plurality of reference vertices; and said step of determining whether the distance is within a range of distances further comprising determining whether the distance is within a range from the minimum distance and the maximum distance.

43. A non-transitory computer-readable medium carrying one or more sequences of instructions for segmenting significant regions in measurements of a target body, wherein execution of the one or more sequences of instructions by one or more processors causes the one or more processors to perform the steps of:

receiving reference data comprising a plurality of values each associated with a plurality of coordinate values for spatial or temporal dimensions based on a first measurement mode of a reference body;

receiving reference segmentation data comprising a plurality of coordinate values for spatial or temporal dimensions for each vertex in a plurality of vertices that indicates a boundary of a physical component of the reference body in the same coordinate frame as the reference measured data;

receiving target data comprising a plurality of values each associated with a plurality of coordinate values for spatial or temporal dimensions based on a second measurement mode of a target body;

automatically determining a particular transformation to maximize a similarity measure between the reference data and the target data;

transforming the reference segmentation data using the particular transformation to produce transformed segmentation data that indicates in the target data a boundary of the physical component of the target body, and adjusting a coordinate for a vertex of the transformed segmentation data based on a plurality of gradients in values of the target data in a vicinity of the vertex.

44. A non-transitory computer-readable medium carrying one or more sequences of instructions for segmenting significant regions in measurements of a target body, wherein execution of the one or more sequences of instructions by one or more processors causes the one or more processors to perform the steps of:

receiving reference segmentation data comprising a plurality of coordinate values for spatial or temporal dimensions for each vertex in a first plurality of vertices that indicates a first boundary of a myocardial wall of a body, and a second plurality of coordinate values for spatial or temporal dimensions for each vertex in a second plurality of vertices that indicates a second boundary of the myocardial wall of the body;

receiving target data comprising a plurality of values each associated with a plurality of coordinate values for spatial or temporal dimensions based on a measurement mode of the body; and adjusting a coordinate for a first vertex of the first plurality of vertices toward a higher gradient in values of the target data in a vicinity of the first vertex, comprising the steps of determining a local separation distance from the first vertex to the second boundary, adjusting the coordinate based on the local separation distance.

45. A non-transitory computer-readable medium carrying one or more sequences of instructions for segmenting significant regions in measurements of a target body, wherein execution of the one or more sequences of instructions by one or more processors causes the one or more processors to perform the steps of:

receiving reference segmentation data comprising a plurality of coordinate values for spatial or temporal dimensions for each vertex in a plurality of vertices that indicates a boundary of a physical component of a body;

receiving target data comprising a plurality of values each associated with a plurality of coordinate values for spatial or temporal dimensions based on a measurement mode of the body; and adjusting a coordinate for a vertex of the plurality of vertices toward a higher gradient in values of the target data in a vicinity of the vertex, further comprising the steps of computing a measure of curvature at the vertex,
  determining whether the measure of curvature exceeds a threshold curvature, and
  if it is determined that the measure of curvature exceeds the threshold curvature, then changing a coordinate of the vertex to reduce the measure of curvature,
whereby after all adjustments in an absence of a higher gradient, the plurality of vertices form a non-circular shape in at least one plane.

46. A non-transitory computer-readable medium carrying one or more sequences of instructions for segmenting significant regions in measurements of a target body, wherein execution of the one or more sequences of instructions by one or more processors causes the one or more processors to perform the steps of:
  receiving segmentation data comprising a plurality of coordinate values for spatial or temporal dimensions for each vertex in a plurality of vertices that indicates a boundary of a physical component of a body;
  receiving target data comprising a plurality of values each associated with a plurality of coordinate values for spatial or temporal dimensions based on a measurement mode of the body; and
  adjusting a coordinate for a vertex of the plurality of vertices toward a higher gradient in values of the target data in a vicinity of the vertex, further comprising
    deriving a vector field that points toward high gradient coordinates in the target data which represent edges in the target data based on applying in three dimensions a generalized gradient vector field (GGVF) process that iteratively grows from an initial vector field based on edge detection in the target data to the vector field by filling regions of low amplitude edges with vectors that point to a region of large amplitude edges; and
    adjusting the coordinate based on the vector field.

47. A non-transitory computer-readable medium carrying one or more sequences of instructions for segmenting significant regions in measurements of a target body, wherein execution of the one or more sequences of instructions by one or more processors causes the one or more processors to perform the steps of:
  receiving reference range data that indicates a distribution of distances between adjacent vertices among all pairs of adjacent vertices in a reference plurality of reference vertices that indicates a reference boundary of a physical component in a reference body;
  receiving segmentation data comprising a plurality of coordinate values for spatial or temporal dimensions for each vertex in a particular plurality of vertices that indicates a particular boundary of the physical component of a particular body;
  receiving target data comprising a plurality of values each associated with a plurality of coordinate values for spatial or temporal dimensions based on a measurement mode of the particular body; and
  adjusting a coordinate for a vertex of the particular plurality of vertices toward a higher gradient in values of the target data in a vicinity of the vertex, comprising the steps of
    determining a distance from the vertex to an adjacent vertex of the first plurality of vertices,
    determining whether the distance is within a range of distances based on the reference range data, and
    if it is determined that the distance is not within the range of distances, then determining an edge length adjustment proportional to a difference between the distance and the range of distances.

* * * * *

UNITED STATES PATENT AND TRADEMARK OFFICE
CERTIFICATE OF CORRECTION

PATENT NO. : 7,689,021 B2
APPLICATION NO. : 11/513082
DATED : March 30, 2010
INVENTOR(S) : Shekhar et al.

It is certified that error appears in the above-identified patent and that said Letters Patent is hereby corrected as shown below:

In the Specifications:
Column 9, line 19, replace "indicted" with "indicated";
Column 11, line 64, replace "452b" with "542b";
Column 16, line 19, replace "eEdge" with "edge";
Column 16, line 38, replace "$\tau\gamma_{x,y}$" with "$\tau\gamma_{x,y,z}$";
Column 18, line 46, replace "$vi$" with "$Vi$";
Column 20, line 29, replace "bu" with "but";
Column 21, line 34, before "SLi >", remove "(".

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,689,021 B2
APPLICATION NO. : 11/513082
DATED : March 30, 2010
INVENTOR(S) : Shekhar et al.

Page 1 of 1

It is certified that error appears in the above-identified patent and that said Letters Patent is hereby corrected as shown below:

On Title page, Add item (73) Assignee:

Cleveland Clinic Foundation, Cleveland, OH (US)

Signed and Sealed this
Fourth Day of September, 2012

David J. Kappos
*Director of the United States Patent and Trademark Office*